United States Patent
Okada et al.

(10) Patent No.: US 10,538,122 B2
(45) Date of Patent: Jan. 21, 2020

(54) IDENTIFICATION DEVICE, IDENTIFICATION METHOD, AND COMPUTER-READABLE MEDIUM INCLUDING IDENTIFICATION PROGRAM

(71) Applicant: TOPPAN PRINTING CO., LTD., Tokyo (JP)

(72) Inventors: Takashi Okada, Tokyo (JP); Tomohito Masuda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 37 days.

(21) Appl. No.: 15/688,100

(22) Filed: Aug. 28, 2017

(65) Prior Publication Data

US 2017/0355214 A1 Dec. 14, 2017

Related U.S. Application Data

(63) Continuation of application No. PCT/JP2016/055234, filed on Feb. 23, 2016.

(30) Foreign Application Priority Data

Mar. 19, 2015 (JP) .................................. 2015-056707

(51) Int. Cl.
  *B42D 25/309* (2014.01)
  *G07D 7/12* (2016.01)
  (Continued)

(52) U.S. Cl.
  CPC ............. *B42D 25/309* (2014.10); *G07D 7/12* (2013.01); *G07D 7/206* (2017.05); *G07D 7/2016* (2013.01); *G07D 7/207* (2017.05)

(58) Field of Classification Search
  CPC .. B42D 25/309; B42D 25/324; B42D 25/328; G07D 7/0032; G07D 7/206; G07D 7/12; G07D 7/20; G07D 7/2016
  See application file for complete search history.

(56) References Cited

U.S. PATENT DOCUMENTS 6,848,561 B2  2/2005 Bao
9,672,510 B2 * 6/2017 Roach .................. G06Q 20/042
(Continued)

FOREIGN PATENT DOCUMENTS

DE  10 2013 101 587 A1  8/2014
JP       2003-254910       9/2003
(Continued)

OTHER PUBLICATIONS

International Search Report dated Apr. 26, 2016 in corresponding International Patent Application No. PCT/JP2016/055234.
(Continued)

*Primary Examiner* — David F Dunphy

(57) ABSTRACT

An identification device includes: an observation object shape frame display configured to display, on a display screen, an observation object shape image indicating a shape of an anti-counterfeit medium observed at an observation angle, and display image data that is an image of an imaging object of an image-capturing device, the anti-counterfeit medium being designed such that an observed pattern of light varies as the observation angle varies; a shape similarity calculator configured to calculate a shape similarity between the observation object shape image and an outer shape of the anti-counterfeit medium; and an imaging determinator configured to perform imaging determination as to whether the observation angle and an observation position of the image-capturing device are correct based on whether the shape similarity is equal to or greater than a shape similarity threshold.

8 Claims, 13 Drawing Sheets

(51) Int. Cl.
*G07D 7/20* (2016.01)
*G07D 7/206* (2016.01)
*G07D 7/207* (2016.01)

(56) References Cited

U.S. PATENT DOCUMENTS

| | | | | |
|---|---|---|---|---|
| 2006/0236115 | A1* | 10/2006 | Haneda | G06K 19/08 |
| | | | | 713/182 |
| 2015/0090777 | A1* | 4/2015 | Cho | G06K 7/1417 |
| | | | | 235/375 |
| 2015/0116530 | A1* | 4/2015 | Lau | G07D 7/2008 |
| | | | | 348/222.1 |
| 2015/0138399 | A1* | 5/2015 | Ma | G06K 9/00624 |
| | | | | 348/239 |
| 2015/0347860 | A1* | 12/2015 | Meier | G06K 9/72 |
| | | | | 382/140 |
| 2015/0347861 | A1* | 12/2015 | Doepke | H04N 5/23245 |
| | | | | 382/199 |
| 2015/0350562 | A1* | 12/2015 | Hubel | H04N 5/265 |
| | | | | 348/239 |

FOREIGN PATENT DOCUMENTS

| | | |
|---|---|---|
| JP | 3865763 | 1/2007 |
| JP | 2010-124069 | 6/2010 |

OTHER PUBLICATIONS

Extended European Search Report dated Oct. 19, 2018 in corresponding European Application No. 16764643.9.
Korean Office Action dated Oct. 11, 2018 in corresponding Korean Application No. 10-2017-7024331.
Chinese Office Action dated Jul. 29, 2019 in corresponding Chinese Patent Application No. 201680013556.1.

* cited by examiner

FIG. 12A

| CAPTURED IMAGE DATA IDENTIFICATION INFORMATION | OBSERVATION OBJECT SHAPE FRAME IDENTIFICATION INFORMATION | CAPTURED IMAGE DATA ADDRESS |
|---|---|---|
| * * * * * | * * * * * | * * * * * |
| * * * * * | * * * * * | * * * * * |
| * * * * * | * * * * * | * * * * * |
| ⋮ | ⋮ | ⋮ |

FIG. 12B

| CAPTURED IMAGE DATA IDENTIFICATION INFORMATION | CORRECT IMAGE DATA ADDRESS | SIMILARITY |
|---|---|---|
| * * * * * | * * * * * | * * * * * |
| * * * * * | * * * * * | * * * * * |
| * * * * * | * * * * * | * * * * * |
| ⋮ | ⋮ | ⋮ | though
IDENTIFICATION DEVICE, IDENTIFICATION METHOD, AND COMPUTER-READABLE MEDIUM INCLUDING IDENTIFICATION PROGRAM

CROSS REFERENCE TO RELATED APPLICATIONS

This application is a continuation application based on a PCT Patent Application No. PCT/JP2016/055234, filed Feb. 23, 2016, whose priority is claimed on Japanese Patent Application No. 2015-056707 filed Mar. 19, 2015, the entire contents of which are hereby incorporated by reference.

BACKGROUND OF THE INVENTION

Field of the Invention

The present invention relates to an identification device, an identification method, and a computer-readable medium including an identification program that can be utilized for authenticity determination against counterfeiting of securities such as gift certificates, credit cards, brand items, and equipment parts.

Description of the Related Art

Conventionally, in order to prevent unauthorized use of products due to counterfeiting or duplication, anti-counterfeit media are used for securities such as bills, stock certificates, gift certificates, and credit cards, or products such as pharmaceutical drugs, food items, and luxury brand items. The anti-counterfeit media are directly printed or transferred on the securities. Seals or tags provided with the anti-counterfeit media are attached to the products.

In recent years, however, illicit securities and products with counterfeit or duplicate anti-counterfeit media have been manufactured. It is therefore difficult to determine whether the securities and products are genuine articles or illicit articles (counterfeit articles/duplicate articles) only based on the presence or absence of anti-counterfeit media.

Examples of the anti-counterfeit medium described above include a diffraction grating, a hologram, and the like whose color or pattern varies in accordance with the observation angle. Other examples of the anti-counterfeit medium include an optically variable device (OVD) ink, a pearl pigment, and the like whose color or brightness varies.

Although it can be easily determined whether the anti-counterfeit medium is authentic or fake by comparison with an authentic anti-counterfeit medium or visual inspection by experts, it is difficult for a general user to determine the authenticity of the anti-counterfeit medium easily and visually.

When the authenticity of the anti-counterfeit medium cannot be visually determined, a special authenticity determination device (for example, refer to Japanese Patent No. 3865763) is utilized which can strictly control the observation angle and observation position of an imaging device with respect to the anti-counterfeit medium. However, since handling of the authenticity determination device requires expert knowledge and special equipment, it is difficult for a general user to determine the authenticity of the anti-counterfeit medium using such a device.

When determining the authenticity of the anti-counterfeit medium on which the optical change in the observed pattern occurs at a predetermined observation angle, since the optical change in the observed pattern varies in accordance with the observation angle, it is necessary to estimate the observation angle on which an imaging direction of an image-capturing device for observing the anti-counterfeit medium depends. Conventionally, a tilt sensor such as a gyro sensor incorporated in the image-capturing device is used for the estimation of the observation angle.

It is also conceivable that the observation angle and observation position be detected by the tilt sensor or the like, and an image of the anti-counterfeit medium be captured by the image-capturing device at the observation angle and observation position appropriate for determining the authenticity.

However, a general user cannot strictly grasp and control the positional relationship between the image-capturing device and the anti-counterfeit medium. For this reason, it is difficult to capture the anti-counterfeit medium using the image-capturing device from the appropriate observation angle and observation position at which the hologram can be captured.

The observed pattern varies in accordance with the observation angle and observation position of the anti-counterfeit medium relative to the image-capturing device. Therefore, in order to accurately determine the observation angle of the image-capturing device to the anti-counterfeit medium, the angle and position of each of the image-capturing device and the anti-counterfeit medium need to be detected. Thus, tilt sensors need to be mounted on both the imaging device and the anti-counterfeit medium.

The present invention has been made in consideration of the above circumstances, and provides an identification device, an identification method, and a computer-readable medium including an identification program capable of easily capturing an image for use in the authenticity determination (identification as to whether authentic or fake) at an appropriate observation angle and observation position using a simple image-capturing device such as a general-purpose digital camera to determine the authenticity of an anti-counterfeit medium, without using a conventional special authenticity determination device and without depending on the installation state of the anti-counterfeit medium.

SUMMARY OF THE INVENTION

A first aspect of the present invention is an identification device that performs authenticity determination on an article with an anti-counterfeit medium attached, the identification device including: an observation object shape frame display configured to display, on a display screen, an observation object shape image indicating a shape of the anti-counterfeit medium observed at an observation angle, and display image data that is an image of an imaging object of an image-capturing device, the anti-counterfeit medium being designed such that an observed pattern of light varies as the observation angle varies; a shape similarity calculator configured to calculate a shape similarity between the observation object shape image and an outer shape of the anti-counterfeit medium serving as the imaging object on the display screen; and an imaging determinator configured to perform imaging determination as to whether or not the observation angle and an observation position of the image-capturing device are correct based on whether or not the shape similarity is equal to or greater than a preset shape similarity threshold.

A second aspect of the present invention is the identification device according to the first aspect, further including an observation object shape image generator configured to generate the observation object shape image indicating the shape of the anti-counterfeit medium observed from an appropriate observation angle and observation position and indicating the observation angle and the observation position at which the anti-counterfeit medium is captured.

A third aspect of the present invention is the identification device according to the first or second aspect, further including: a similarity calculator configured to compare captured image data obtained from the anti-counterfeit medium captured with correct image data that is a correct pattern of the anti-counterfeit medium to obtain a similarity between the captured image data and the correct image data; and an authenticity determinator configured to perform the authenticity determination as to whether or not the anti-counterfeit medium is correct based on whether or not the similarity exceeds a preset similarity threshold.

A fourth aspect of the present invention is the identification device according to the third aspect, the authenticity determinator comparing pieces of captured image data captured so as to correspond to a plurality of different observation object shape images with pieces of correct image data corresponding to the observation object shape images of the pieces of captured image data, and performing the authenticity determination based on whether or not the similarity between each of the pieces of captured image data and the corresponding piece of correct image data exceeds the similarity threshold.

A fifth aspect of the present invention is the identification device according to the third or fourth aspect, further including a candidate image data extractor configured to compare the captured image data with pieces of candidate image data having lower resolutions than the pieces of correct image data of a plurality of different types of the anti-counterfeit media, and extract a piece of candidate image data having the highest similarity, and the similarity calculator calculates the similarity of the piece of candidate image data extracted by the candidate image data extractor.

A sixth aspect of the present invention is the identification device according to any one of the first to fifth aspects, including a notification function of giving a notification of an imaging direction for the anti-counterfeit medium corresponding to the observation object shape image.

A seventh aspect of the present invention is an identification method for performing authenticity determination on an article with an anti-counterfeit medium attached, the identification method including: displaying, on a display screen using an observation object shape frame display, an observation object shape image indicating a shape of the anti-counterfeit medium observed at an observation angle, and display image data that is an image of an imaging object of an image-capturing device, the anti-counterfeit medium being designed such that an observed pattern of light varies as the observation angle varies; calculating, using a shape similarity calculator, a shape similarity between the observation object shape image and an outer shape of the anti-counterfeit medium serving as the imaging object on the display screen; and performing, using an imaging determinator, imaging determination as to whether or not the observation angle and an observation position of the image-capturing device are correct based on whether or not the shape similarity is equal to or greater than a preset shape similarity threshold.

An eighth aspect of the present invention is an identification program that causes a computer to execute an authenticity determination method for an article with an anti-counterfeit medium attached, the authenticity determination method including: displaying, on a display screen, an observation object shape image indicating a shape of the anti-counterfeit medium observed at an observation angle, and display image data that is an image of an imaging object of an image-capturing device, the anti-counterfeit medium being designed such that an observed pattern of light varies as the observation angle varies; calculating a shape similarity between the observation object shape image and an outer shape of the anti-counterfeit medium serving as the imaging object on the display screen; and performing imaging determination as to whether or not the observation angle and an observation position of the image-capturing device are correct based on whether or not the shape similarity is equal to or greater than a preset shape similarity threshold.

A ninth aspect of the present invention is a computer-readable medium including an identification program that causes a computer to execute an authenticity determination method for an article with an anti-counterfeit medium attached, the authenticity determination method including: displaying, on a display screen, an observation object shape image indicating a shape of the anti-counterfeit medium observed at an observation angle, and display image data that is an image of an imaging object of an image-capturing device, the anti-counterfeit medium being designed such that an observed pattern of light varies as the observation angle varies; calculating a shape similarity between the observation object shape image and an outer shape of the anti-counterfeit medium serving as the imaging object on the display screen; and performing imaging determination as to whether or not the observation angle and an observation position of the image-capturing device are correct based on whether or not the shape similarity is less than a preset shape similarity threshold.

The above aspects according to the present invention can provide an identification device, an identification method, and a computer-readable medium including an identification program capable of easily capturing an image for use in authenticity determination (identification as to whether authentic or fake) at an appropriate observation angle and observation position using a simple image-capturing device such as a general-purpose digital camera to determine the authenticity of an anti-counterfeit medium, without using a conventional special authenticity determination device and without depending on the installation state of the anti-counterfeit medium.

BRIEF DESCRIPTION OF THE DRAWINGS

FIG. 12A is a diagram illustrating an exemplary configuration of a captured image data table and a captured image data table for authenticity determination stored in an image data storage 113.

FIG. 12B is a diagram illustrating an exemplary configuration of the captured image data table and the captured image data table for authenticity determination stored in the image data storage 113.

DETAILED DESCRIPTION OF THE PREFERRED EMBODIMENTS

First Embodiment

Hereinafter, a first embodiment of the present invention will be described with reference to the drawings.

Figure 1:
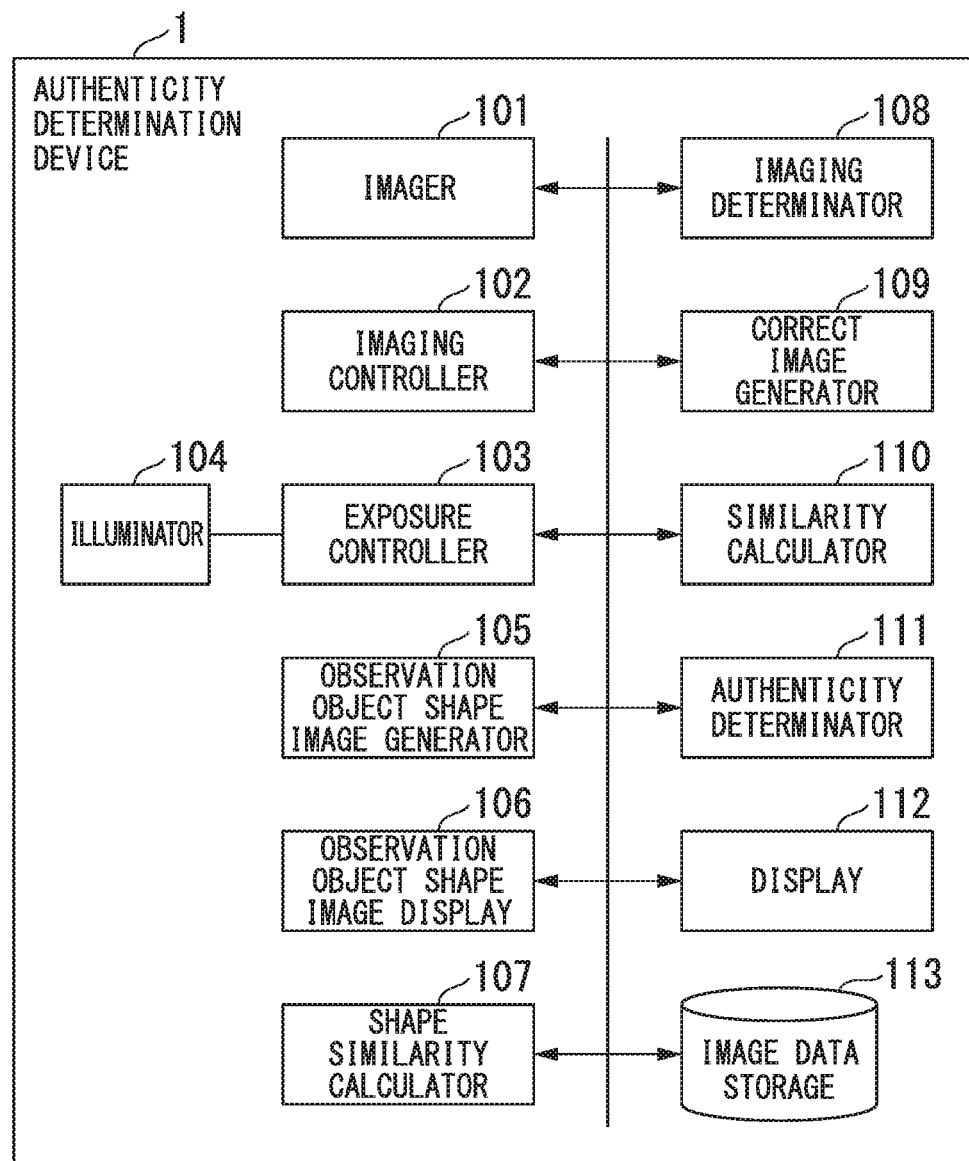
FIG. 1 is a block diagram illustrating an exemplary configuration of an identification device according to a first embodiment.

FIG. 1 is a block diagram illustrating an exemplary configuration of an identification system (authenticity determination device, or identification device) according to the first embodiment. In FIG. 1, the authenticity determination device 1 includes an imager 101, an imaging controller 102, an exposure controller 103, an illuminator 104, an observation object shape image generator 105, an observation object shape image display 106, a shape similarity calculator 107, an imaging determinator 108, a correct image generator 109, a similarity calculator 110, an authenticity determinator 111, a display 112, and an image data storage 113. The identification system of the present embodiment is configured so that the imager 101 and the illuminator 104 are integrated, and configured to be used for an authenticity determination process for an anti-counterfeit medium that serves as a retroreflector.

The imager 101 is, for example, a camera or the like provided with an image sensor such as a charge-coupled device (CCD) or a complementary metal oxide semiconductor (CMOS). The imager 101 writes and stores, in the image data storage 113, an image of a captured object as captured image data.

The imaging controller 102 controls imaging conditions for the imager 101 such as the depth of focus and the sensitivity of an imaging sensor (International Organization for Standardization (ISO) speed) when the imager 101 captures the captured image data, i.e., an image of a captured pattern of light (color (wavelength)) of light or an image such as a character and a picture) emitted from the anti-counterfeit medium in response to incident light.

The exposure controller 103 controls imaging conditions for the imager 101 such as shutter speed, an aperture value, presence or absence of illumination light, and intensity of illumination light as conditions for imaging related to exposure. The exposure controller 103 also outputs a light-emitting instruction to cause the illuminator 104 to emit imaging light (illumination light) as necessary at the time of imaging in accordance with the brightness around the anti-counterfeit medium to be captured by the authenticity determination device 1.

The illuminator 104 may be not only normal light that continuously irradiates an imaging object with light but also a light-emitting device called a flash or strobe (registered trademark) that irradiates an imaging object with light in a short time. In response to the light-emitting instruction from the exposure controller 103, the illuminator 104 irradiates the object to be captured with light having a predetermined intensity. The imaging controller 102 supplies a control signal indicating the imaging timing to the exposure controller 103. Consequently, as mentioned above, the exposure controller 103 outputs the light-emitting instruction to cause the illuminator 104 to emit the illumination light with which the anti-counterfeit medium is irradiated in response to the control signal indicating the imaging timing supplied from the imaging controller 102.

The observation object shape image generator 105 generates an observation object shape frame (that is, observation object shape image) indicating an outer shape of the anti-counterfeit medium observed from an appropriate observation angle and observation position and indicating the observation angle and the observation position at which the anti-counterfeit medium to be subjected to the determination is captured. The observation object shape image generator 105 obtains, using a coordinate transformation formula, an image of the observation object shape frame that is the outer shape of the anti-counterfeit medium in accordance with the observation position (coordinate value) and observation angle (imaging direction) of the imager 101 so that the pattern emitted from the anti-counterfeit medium can be suitably captured when the anti-counterfeit medium is captured. The observation position is a position at which the imaging object is captured by the imager 101 in a three-dimensional space where the imaging object exists.

The observation object shape image generator 105 writes and stores the generated observation object shape frame in an observation object shape frame table in association with observation object shape frame identification information for identifying the observation object shape frame.

The coordinate transformation formula as used herein is generated when the three-dimensional space is reproduced from a plurality of pieces of captured image data (captured image data obtained from a captured calibration board to be described later) in advance as preprocessing for performing the authenticity determination process on the anti-counterfeit medium provided on an authenticity determination object (preparation for performing the authenticity determination process), and two-dimensional coordinate positions of pixels of the plurality of pieces of captured image data are associated with coordinate positions in the three-dimensional space. The coordinate transformation formula generated in advance is written and stored in advance in the image data storage 113 in association with each authenticity determination object.

The observation object shape frame table is written in the image data storage 113. In accordance with the observation object shape frame identification information, the observation object shape frame identification information and information on the observation angle and observation position at which the observation object shape frame indicated by the observation object shape frame identification information has been generated are written as a set in the observation object shape frame table.

In the present embodiment, camera calibration needs to be performed on the imager 101 in advance. In the camera calibration, the calibration board having a known three-dimensional shape is captured in advance once or multiple times within an imaging region, and using one or more pieces of captured image data, a plurality of coordinate points, that is, coordinate points in a three-dimensional coordinate system in the three-dimensional space and coordinate points (two-dimensional pixels) in a two-dimensional coordinate system of the captured image data, are correlated with each other. Consequently, the coordinate transformation formula indicating the relative positional relationship (hereinafter referred to as an external parameter) between the imager 101 and the calibration board is estimated, and the optical center of the imager 101, a beam incident direction vector at each pixel (two-dimensional pixel) of the imager 101, distortion of a lens of the imager 101, and the like (hereinafter referred to as an internal parameter of the imager 101) are estimated.

In other words, in the present embodiment, in order for the observation object shape image generator 105 to estimate the observation angle for the observation object shape frame, a global coordinate system (three-dimensional coordinate system) is reconstructed from the two-dimensional images obtained from the calibration board captured by the imager 101 in advance in a plurality of different viewpoint directions, that is, reconstructed from multi-view captured image data. The coordinate transformation formula indicating the correspondence relationship between a coordinate point of a pixel in the reconstructed three-dimensional coordinate system and a coordinate point of the same pixel in the two-dimensional coordinate system of the captured image data captured by the imager 101 is obtained at the time of camera calibration.

As mentioned above, with regard to the estimation of the observation angle according to the present embodiment, the camera calibration is performed on the imager 101 in advance, the internal parameter of the imager 101 is known when the authenticity determination process for the anti-counterfeit medium is executed in the identification system, and the three-dimensional shapes of the authenticity determination object and the anti-counterfeit medium are also known. Consequently, pieces of captured image data of the anti-counterfeit medium are captured from a plurality of different positions, and a plurality of pieces of corresponding point information between coordinate points in the three-dimensional coordinate system and pixels in the two-dimensional coordinate system of the pieces of captured image data are obtained using the coordinate transformation formula. The relative positional relationship between the imager 101 and the anti-counterfeit medium can be estimated from a plurality of corresponding point coordinates. Similarly, in a case where the anti-counterfeit medium is captured only once, a plurality of pieces of corresponding point information between coordinate points in the three-dimensional coordinate system and pixels in the two-dimensional coordinate system are obtained from the single piece of captured image data using the coordinate transformation formula. The relative positional relationship between the imager 101 and the anti-counterfeit medium can be estimated from a plurality of corresponding point coordinates. In other words, the observation position and observation angle (imaging direction) of the imager 101 at which the anti-counterfeit medium has been captured can be estimated.

In the present embodiment, as an example of the camera calibration, an analysis technique proposed by Z. Zhang (Z. Zhang, "A flexible new technique for camera calibration", IEEE Transactions on Pattern Analysis and Machine Intelligence, Vol. 22, No. 11, pages 1330-1334, 2000), which is one of the well-known techniques, can be applied to the estimation of the observation angle at which the captured image data has been captured. However, in a case where the observation angle is estimated using the analysis technique proposed by Z. Zhang, the captured image data to be input to the identification system needs to be captured at a focus similar to the focus fixed at the time of camera calibration (and desirably at the same focus).

The above-mentioned external parameter is a 3×4 matrix including rotation and translation components, and hereinafter referred to as the matrix P. The internal parameter is a 3×3 matrix and hereinafter referred to as the matrix A. Assuming that three-dimensional coordinates of a certain point on an anti-counterfeit medium 400 (details will be described later) are X, Y, Z, and two-dimensional pixel coordinates of the anti-counterfeit medium 400 photographed on the captured image are x, y, a relational expression expressed by Formula (1) below is established.

Formula (1)

$$s \begin{pmatrix} x \\ y \\ 1 \end{pmatrix} = AP \begin{pmatrix} X \\ Y \\ Z \\ 1 \end{pmatrix} \qquad (1)$$

In Formula (1), s is a scaling parameter and has the same value as the component of the (3×1)-th matrix on the calculated right side. If the internal parameter is known, and the external parameter that is based on the specific observation angle and observation position for observing the pattern of light for use in the authenticity determination is calculated, the matrices A and P in Formula (1) are known values, and the three-dimensional coordinates X, Y, Z of the point on the anti-counterfeit medium 400 can be transformed into the two-dimensional coordinates x, y of the point on the image of the observation object shape frame. With regard to the coordinate system of the three-dimensional coordinates X, Y, Z of the point on the anti-counterfeit medium 400 (hereinafter referred to as a world coordinate system), the origin of the coordinate system and the direction of the coordinate axis may be arbitrarily set.

In a case where the anti-counterfeit medium 400 is a flat plate, generally, any one point on an observed upper surface of the anti-counterfeit medium 400 is taken as the origin, an imaging object surface to be captured by the imager 101 is set on the two-dimensional coordinate system including the X and Y axes, and the Z axis is set in a direction orthogonal to the two-dimensional coordinate system. The unit must be the same as that of the camera calibration. For example, in a case where the internal parameter is obtained in the world coordinate system with a unit of mm at the time of camera calibration, the world coordinate system for the calculation of the observation object shape frame also needs to be expressed with a unit of mm as in the case of the calibration. Otherwise the shape of the observation object shape frame does not coincide with the shape of the anti-counterfeit medium 400 observed from the specific observation angle and observation position.

Assuming that a 3×3 three-dimensional rotation matrix of the external parameter is R, and a 3×1 three-dimensional translation matrix is t, each component in the three-dimensional rotation matrix R is expressed by Formula (2) below.

Formula (2)

$$R = \begin{pmatrix} r_{11} & r_{12} & r_{13} \\ r_{21} & r_{22} & r_{23} \\ r_{31} & r_{32} & r_{33} \end{pmatrix} \quad (2)$$

Each component in the three-dimensional translation matrix t is expressed by Formula (3) below.

Formula (3)

$$t = \begin{pmatrix} t_x \\ t_y \\ t_z \end{pmatrix} \quad (3)$$

Each component of the external parameter P is expressed by Formula (4) below.

Formula (4)

$$P = \begin{pmatrix} r_{11} & r_{12} & r_{13} & t_x \\ r_{21} & r_{22} & r_{23} & t_y \\ r_{31} & r_{32} & r_{33} & t_z \end{pmatrix} \quad (4)$$

A three-dimensional coordinate system including the center of the camera lens of the imager 101 as the origin, a front direction with respect to the lens as the z axis, and directions that are the same as the x and y axes on the captured image as the x and y axes is called a camera coordinate system. The unit of each coordinate in the camera coordinate system is the same as that of the world coordinate system. Each of the three-dimensional rotation matrix R and the three-dimensional translation matrix t depends on the three-dimensional relative positional relationship between the camera coordinate system and the world coordinate system. The three-dimensional translation matrix t is the three-dimensional position of the origin of the world coordinate system seen from the camera coordinate system. The three-dimensional rotation matrix R is a three-dimensional rotation matrix by which the coordinate axis of the camera coordinate system is multiplied when the coordinate axis of the camera coordinate system is rotated so as to coincide with the coordinate axis of the world coordinate system.

From the above description, by defining the world coordinate system of the anti-counterfeit medium 400 when the internal parameter A is known, the external parameter P, i.e., the relative relationship between the world coordinate system and the camera coordinate system of an imaging device for a case where the anti-counterfeit medium 400 is photographed from the specific observation angle and observation position, can be calculated. Consequently, it is possible to calculate, using Formula (1), which point (coordinate point) on the observation object shape frame on the captured image corresponds to a specific point (coordinate point) on the anti-counterfeit medium 400, and calculate the image of the observation object shape frame.

The observation object shape image display 106 displays, on a display screen of the display 112, the observation object shape frame together with a through image (display image data that is an image of the imaging object of the imager 101) that is captured by the imager 101 as imaging data.

The display 112 is a display panel that displays the captured imaging data and the result of the authenticity determination, and includes, for example, a liquid crystal display panel.

Figure 2:
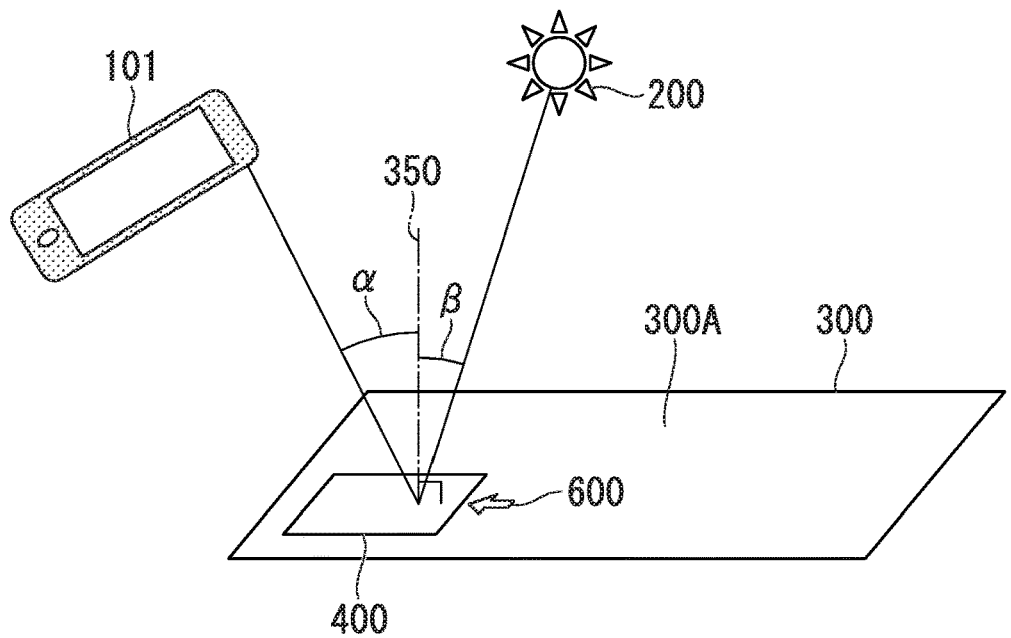
FIG. 2 is a diagram showing an observation angle of an imager 101 to an anti-counterfeit medium.

FIG. 2 is a diagram showing the observation angle of the imager 101 to the anti-counterfeit medium. In FIG. 2, for example, the anti-counterfeit medium 400 is used for the prevention of counterfeiting and duplication of securities such as vouchers such as bills, stock certificates, and gift certificates or credit cards, or products such as pharmaceutical drugs, food items, and luxury brand items. The anti-counterfeit medium 400 is directly printed or transferred on a voucher or security, or printed or transferred on a seal or tag attached to a product (or a product package).

In FIG. 2, the anti-counterfeit medium 400 is provided on a surface of a credit card 300. In the present embodiment, examples of the anti-counterfeit medium 400 include a diffraction grating, a hologram, and the like whose color or pattern varies in accordance with the observation angle. Alternatively, an optically variable device (OVD) ink, a pearl pigment, and the like whose color or brightness varies in accordance with the observation angle can be used (details will be described later). A light source (also referred to as illumination) 200 irradiates the anti-counterfeit medium 400 with imaging light at an irradiation angle β which is an angle between a light irradiation direction 200A and a normal 350. In response to receiving the imaging light, the anti-counterfeit medium emits a predetermined pattern of light. The pattern of light emitted from the anti-counterfeit medium in response to the irradiation light varies in accordance with each of an observation angle α and the irradiation angle β.

Here, the anti-counterfeit medium 400 will be described in detail.

The anti-counterfeit medium 400 may be a kind of hologram that emits various types of diffracted light using a diffraction structure. In this case, various types of holograms such as reflection, transmission, phase, and volume holograms can be used.

Hereinafter, in particular, an example of a relief structure having an uneven structure will be described in detail.

Figure 3:
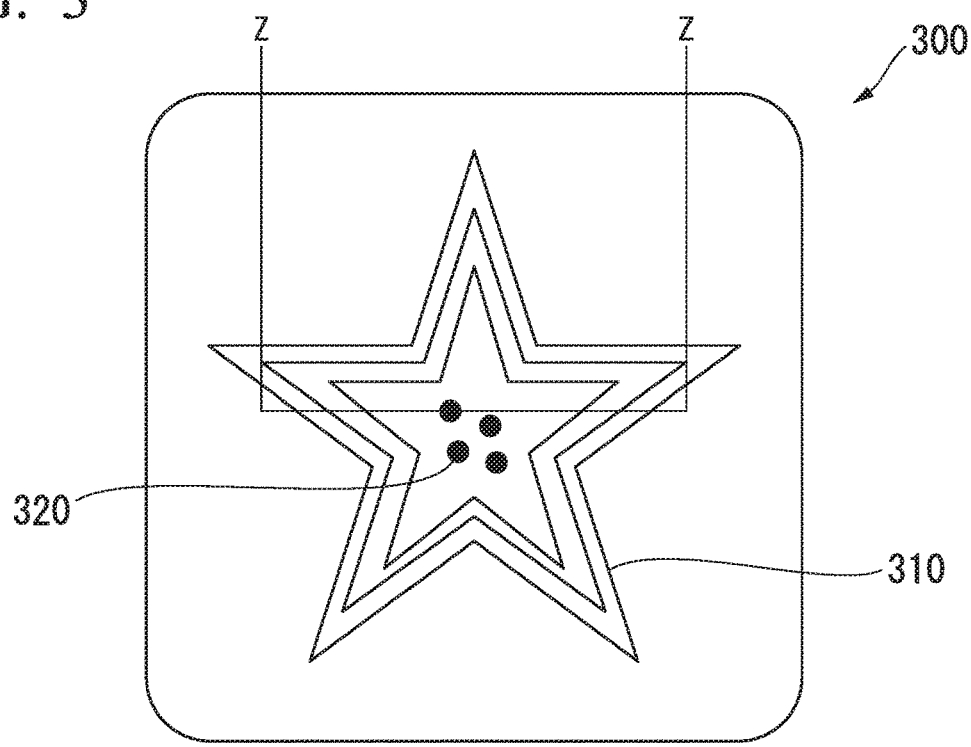
FIG. 3 is a plan view schematically illustrating the anti-counterfeit medium according to the first embodiment.
Figure 4:
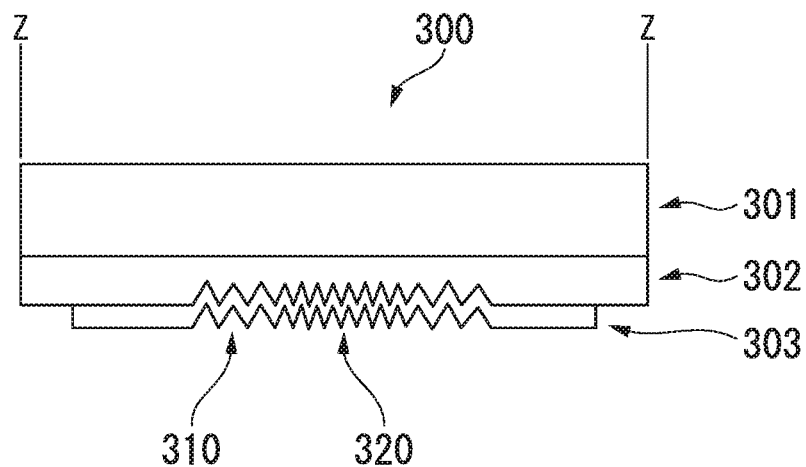
FIG. 4 is a cross-sectional view schematically illustrating a cross-section taken along line Z-Z of the anti-counterfeit medium illustrated in FIG. 3.

As a method of forming an uneven structure such as a first uneven structure portion 310 and a second uneven structure portion 320 formed on a relief structure formation layer 302 illustrated in FIGS. 3 and 4, various methods such as radiation curing molding, extrusion molding, and hot press molding can be employed using a metallic stamper or the like.

The first uneven structure portion 310 has a groove-like structure including a recessed or protruding portion. As the first uneven structure portion 310, an uneven structure can be used such as a relief diffraction grating structure or a directional scattering structure having a region in which a plurality of linear recessed or protruding portions aligned in the same direction are formed and including a combination of a plurality of regions in which the directions are different from each other.

In general, most of the ordinary diffraction gratings used for display bodies have a spatial frequency of 500 to 1600 lines/mm, and can display different colors to a user who observes the diffraction grating in a certain direction in accordance with the spatial frequency or direction of the diffraction grating.

Figure 5:
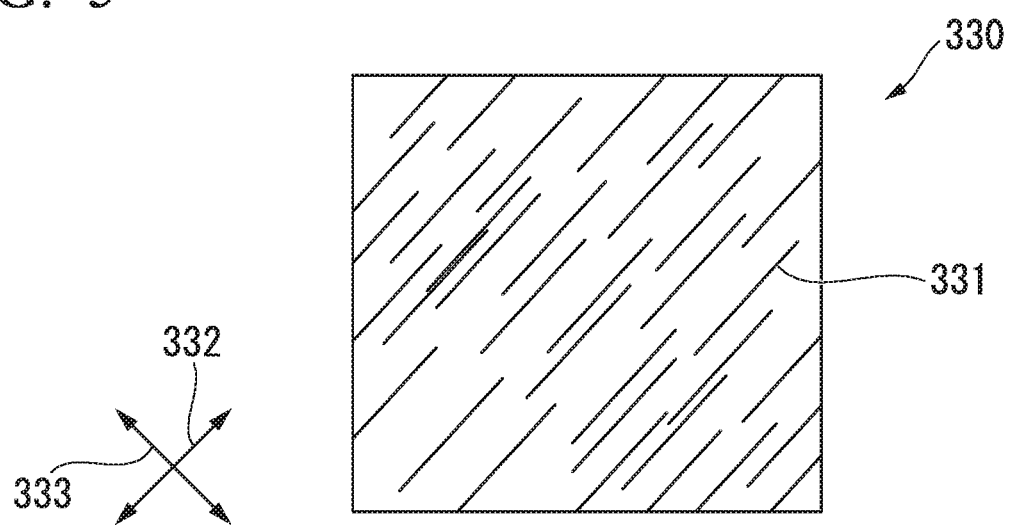
FIG. 5 is a perspective view illustrating an example of a first uneven structure portion of the anti-counterfeit medium according to the first embodiment.

In contrast, the directional scattering structure includes a plurality of light-scattering structures 331 oriented in the same orientation direction 332 within a specific segment or cell as illustrated in FIG. 5. Each of these light-scattering structures 331 is linearly arranged substantially in parallel with the other light-scattering structures within the specific segment or cell.

However, the light-scattering structures 331 do not need to be completely parallel with each other, and as long as the region of the directional scattering structure 330 has a sufficient anisotropic scattering capability, a longitudinal direction of a part of the light-scattering structures 331 and a longitudinal direction of another part of the light-scattering structures 331 may intersect.

Owing to the above structure, when the region including the directional scattering structure 330 is irradiated with light in an oblique direction perpendicular to the orientation direction 332, and the region is observed from the front, the region looks relatively bright due to a high light-scattering capability.

In contrast, when the region including the directional scattering structure 330 is irradiated with light in an oblique direction perpendicular to a light-scattering axis 333, and the region is observed from the front, the region looks relatively dark due to a low light-scattering capability.

Therefore, by arbitrarily providing the orientation direction 332 in each segment or cell including the light-scattering structure 331, a pattern including a combination of a relatively bright portion and a relatively dark portion is formed, and inversion of light and dark portions is observed when the pattern is observed from different observation positions or irradiated with light from different positions.

The first uneven structure portion 301 can have one or a combination of the structures such as the relief diffraction grating structure and the directional scattering structure, but the first uneven structure portion 301 is not necessarily limited to this example.

Figure 6:
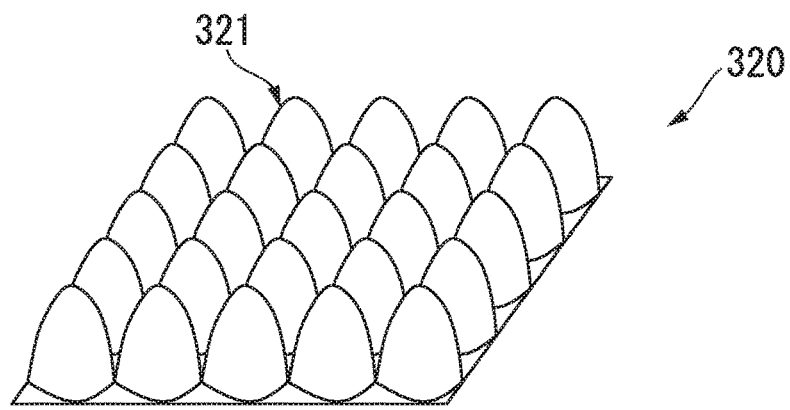
FIG. 6 is a perspective view illustrating an example of a second uneven structure portion of the anti-counterfeit medium according to the first embodiment.
Figure 6:
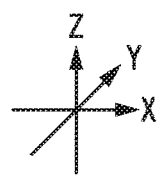

An exemplary structure that can be adopted for the second uneven structure portion 320 is illustrated in FIG. 6 as a perspective view.

A plurality of protruding portions 321 are provided on the second uneven structure portion 320 illustrated in FIG. 6. Although only the plurality of protruding portions 321 constitutes the second uneven structure portion 320, this is merely an example. In the present embodiment, the second uneven structure portion 320 can be formed using a plurality of recessed portions.

The surface area of a single recessed or protruding portion provided on the second uneven structure portion 320 according to the present embodiment is preferably equal to or greater than 1.5 times the occupied area required for arranging a single recessed or protruding portion on a surface of the relief structure formation layer 302.

If a single recessed or protruding portion has a surface area of equal to or greater than 1.5 times the occupied area, a low reflection property and a low scattering property can be successfully obtained. In other words, this configuration is preferable because the color tone of the second uneven structure portion is apparently different from that of the first uneven structure portion, and the second uneven structure portion is easy to recognize when captured by the imager 101. In contrast, a single recessed or protruding portion having a surface area of less than 1.5 times the occupied area is not preferable since such a recessed or protruding portion has a high reflectance.

In addition, each of the plurality of recessed or protruding portions on the second uneven structure portion 320 formed on the relief structure formation layer 302 desirably has a forward tapered shape.

As used herein, the forward tapered shape refers to such a shape that the cross-sectional area parallel with a base surface of the recessed or protruding portion is formed so as to decrease from the proximal end toward the distal end of the recessed or protruding portion. More specifically, examples of the forward tapered shape can include a conical shape, a pyramid shape, an elliptical conical shape, a columnar or cylindrical shape, a prismatic or prismatic cylindrical shape, a truncated conical shape, a truncated pyramid shape, a truncated elliptical conical shape, a conical shape joined to a column or cylinder, a pyramid shape joined to a prism or prismatic cylinder, a hemisphere, a semi-ellipsoid, a bullet shape, a bowl shape, and the like.

Figure 7:
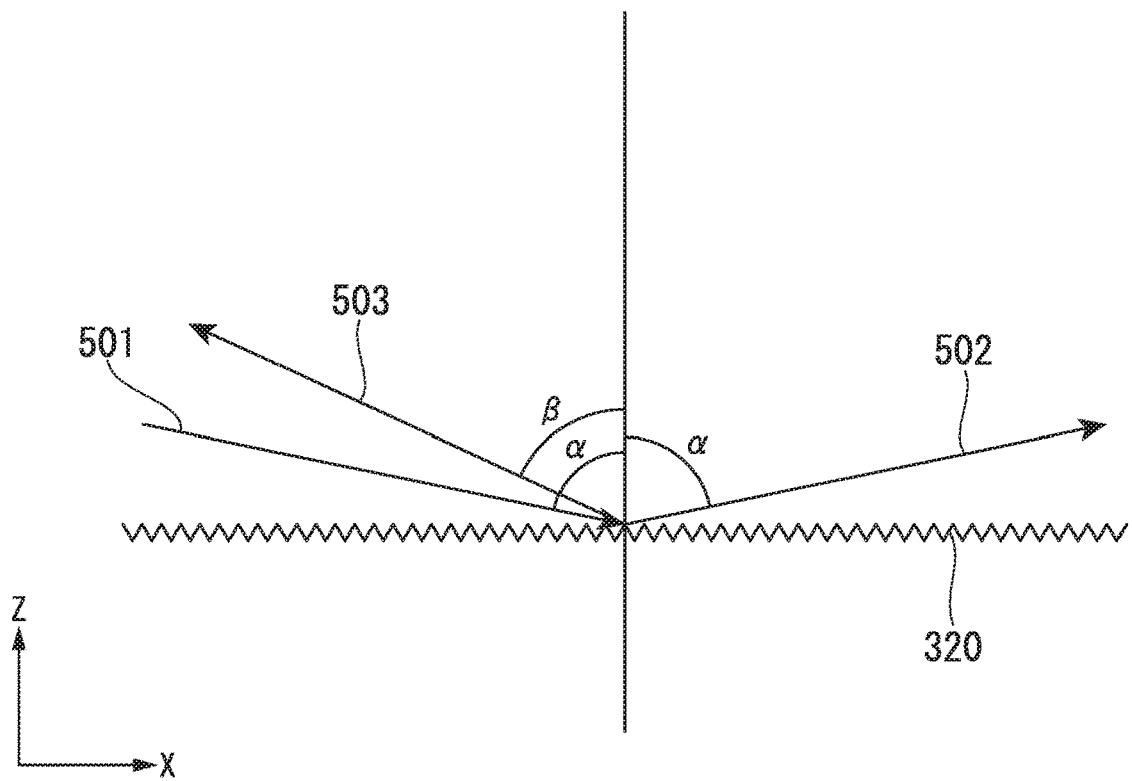
FIG. 7 is a diagram schematically illustrating how the second uneven structure portion emits diffracted light.

As illustrated in FIG. 6, when the distance between the centers of the adjacent recessed or protruding portions on the second uneven structure portion 320 is constant, the second uneven structure portion 320 emits diffracted light in a specific direction with respect to a traveling direction of incident light 501 in response to being irradiated with light as illustrated in FIG. 7.

Generally, diffracted light can be expressed by the following formula.

$$d(\sin \alpha \pm \sin \beta) = n\lambda \tag{5}$$

In Formula (5), d represents the distance between the centers of the recessed or protruding portions, and λ represents the wavelength of the incident light and the diffracted light. In addition, α represents an incident angle of the incident light, β represents an emission angle of the diffracted light, and n is an order. Since the most typical diffracted light is first-order diffracted light, n=1 can be satisfied here.

The incident angle α can be considered the same as an emission angle of zeroth-order diffracted light, that is, specularly reflected light. With regard to α and β, a clockwise direction from a normal direction to the display body, that is, the Z axis in FIG. 7, is regarded as a positive direction. Therefore, Formula (5) is expressed as follows.

$$d(\sin \alpha - \sin \beta) = \lambda \tag{6}$$

Accordingly, when the distance d between the centers of the recessed or protruding portions and the incident angle, that is, the emission angle α of the zeroth-order diffracted light, are constant, the emission angle β of first-order diffracted light 503 varies in accordance with the wavelength λ as is apparent from Formula (6). Therefore, when the illumination light is white light, and the observation angle for the uneven structure portion is changed, the color captured by the imager 101 varies.

Since the second uneven structure portion 320 has the forward tapered shapes in which the distance between the centers of the recessed or protruding portions is 400 nm or less, the second uneven structure portion 320 looks almost black when captured in the normal direction, whereas under specific conditions, that is, under the environment where the incidence angle α of white light is 60° to 90°, the emission angle |β| of the first-order diffracted light 503 of light having a specific wavelength can be designed in the vicinity of the incident angle.

For example, when the incident angle α=60° and d=340 nm are satisfied, the emission angle |β| for λ=600 nm is about 64°.

In contrast, since the first uneven structure portion 310 is a diffraction grating structure or the like, it is difficult to set the emission angle of the first-order diffracted light in the vicinity of the incident angle.

Therefore, in the identification operation using the authenticity determination device 1, the light source 200 and the imager 101 are provided relatively close to each other, whereby a clear change in the color of the second uneven structure portion 320 can be captured under specific conditions.

For example, the anti-counterfeit medium 400 may be configured to utilize surface plasmon propagation generated by nanometer-size microscopic pores, microscopic structures or the like provided on the surface thereof, or configured to utilize a structural color for controlling the color of reflected or transmitted light with respect to incident light, with the depth of the uneven structure controlled.

For example, the anti-counterfeit medium 400 may be configured to utilize a retroreflective property of a microsphere or a spherical structure, configured as an angle control mirror that reflects/transmits incident light only in a specific direction using a gradient formed on a surface structure of a minute region to provide a reflective property, or configured as a printed material having an uneven shape provided by means of intaglio printing.

For example, the anti-counterfeit medium 400 may be configured to include a large number of tall wall surfaces in a narrow region, which are utilized in an anti-peeping film or the like, to utilize a structure that limits the viewing area, configured to utilize a parallax barrier technique for limiting the viewing area with fine lines provided on a screen at specific intervals so that an image formed at the back of the screen looks different, or configured to utilize a lenticular lens, a microlens array or the like so that an image formed at the back of the lens looks different.

For example, the anti-counterfeit medium 400 may be configured to include, by means of printing or the like, a pearl pigment made from mica coated with a metal oxide.

For example, the anti-counterfeit medium 400 may be configured to utilize a multi-layer thin film including a plurality of layers of thin films made of transparent materials or metals having different refractive indices, so that the color varies due to the interference phenomenon in accordance with the reflection or transmission angle of incident light, configured to include flakes of the crushed multi-layer thin film as a pigment by means of printing or the like, configured to include, by means of printing or the like, particles made of microparticles coated with thin films through a chemical process or the like to cause the interference phenomenon, or configured to utilize a liquid crystal material such as cholesteric liquid crystal immobilized with a polymer or the like. As the liquid crystal material, a liquid crystal material provided in a planar form may be used, or a pigment made from a liquid crystal material using a crushing process and provided by means of printing or the like may be used.

For example, the anti-counterfeit medium 400 may be configured to use a magnetic orientation material made of a magnetic substance such as an iron oxide, a chromium oxide, cobalt, ferrite, and the like oriented by magnetic force and provided in a planar form, so that reflected or transmitted light has directivity, configured to include, through the chemical process or the like as mentioned above, a multi-layer film with a core of the magnetic orientation material, or configured to utilize an optic effect generated by nanometer-size particles such as silver nanoparticles and quantum dots.

Returning to FIG. 2, the normal 350 is a normal indicating a surface direction of a surface 300A of the credit card 300. The observation angle α is an angle between an imaging direction of the imager 101 and the normal 350. Here, for example, assuming that a direction parallel with the normal 350 is the z axis, the observation object shape image generator 105 arranges the credit card in the three-dimensional coordinate system so that the respective sides of the credit card 300 are parallel with the x and y axes. For example, the credit card 300 is arranged on a two-dimensional plane including the x and y axes in the three-dimensional coordinate system so that any of the vertexes formed by the respective sides of the credit card 300 coincides with the origin O of the three-dimensional coordinate system. Therefore, a thickness direction of the credit card 300 is parallel with the z axis. The three-dimensional shape of the credit card 300 is written and stored in advance in the image data storage 113 together with the above-mentioned coordinate transformation formula as known information.

Figure 8:
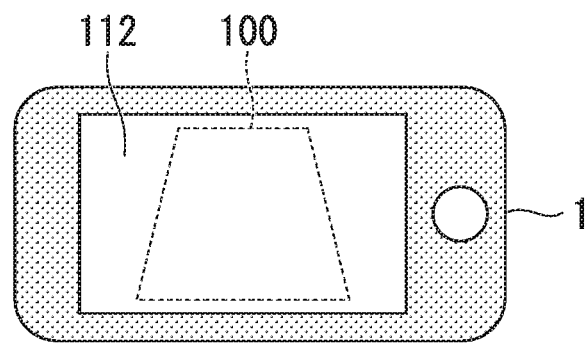
FIG. 8 is a conceptual view illustrating an observation object shape frame displayed on a display 11.

FIG. 8 is a conceptual view illustrating the observation object shape frame displayed on the display 112. In FIG. 8, the observation object shape frame 100 is displayed by the observation object shape image display 106 at a predetermined position on the display 112 on which the through image to be captured as the imaging data is displayed. The observation object shape frame 100 indicates the outer shape of the anti-counterfeit medium using broken lines. However, other line shapes such as solid lines may be used, or a transparent image with a protruded (silhouetted) shape of the anti-counterfeit medium may be used. If the anti-counterfeit medium has a rectangular (for example, quadrangular) shape, an image of the vertexes may be used. To sum up, any image can be used as the observation object shape frame 100 as long as it indicates the outer shape (or entire shape) of the anti-counterfeit medium observed from an appropriate observation angle and observation position. In the example of FIG. 8, the observation object shape frame of the rectangular anti-counterfeit medium is displayed on the display 112.

FIGS. 9A to 11B are views showing positioning of the observation object shape frame 100 depicted in FIG. 8 and the through image 500 of the anti-counterfeit medium 400. The observation object shape frame is an image indicating the outer shape of the anti-counterfeit medium, and indicates an image of a frame including straight lines as the image of the outer shape of the anti-counterfeit medium.

Figure 9A:
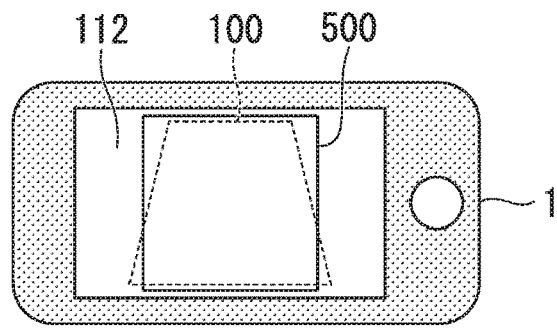
FIG. 9A is a top view showing positioning of the observation object shape frame 100 depicted in FIG. 8 and a through image 500 of the anti-counterfeit medium 400.
Figure 9B:
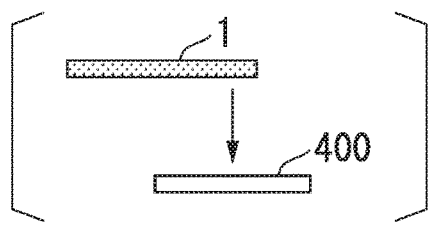
FIG. 9B is a side view showing the positioning of the observation object shape frame 100 depicted in FIG. 8 and the through image 500 of the anti-counterfeit medium 400.

FIG. 9A is a top view illustrating the observation object shape frame 100 and the through image 500 of the anti-counterfeit medium 400 in the positional relationship between the authenticity determination device 1 and the anti-counterfeit medium 400 in FIG. 9B to be described later. FIG. 9B is a side view of FIG. 9A. In FIG. 9B, the imaging direction of the imager 101 is parallel with the normal of the surface of the anti-counterfeit medium 400. Therefore, the observation object shape frame 100 having a shape corresponding to a certain angle to the normal of the surface of the anti-counterfeit medium 400 does not coincide with the through image 500 of the anti-counterfeit medium 400 which is parallel with the normal of the surface of the anti-counterfeit medium 400.

Figure 10A:
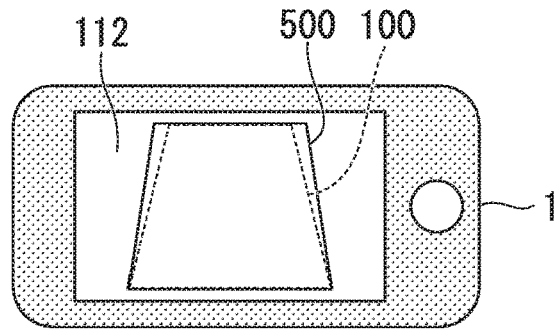
FIG. 10A is a top view showing the positioning of the observation object shape frame 100 depicted in FIG. 8 and the through image 500 of the anti-counterfeit medium 400.
Figure 10B:
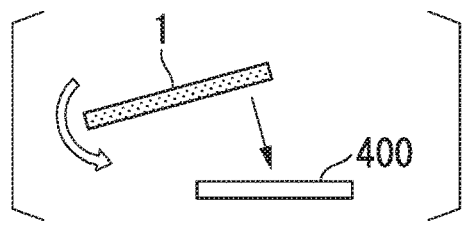
FIG. 10B is a side view showing the positioning of the observation object shape frame 100 depicted in FIG. 8 and the through image 500 of the anti-counterfeit medium 400.

FIG. 10A is a top view illustrating the observation object shape frame 100 and the through image 500 of the anti-counterfeit medium 400 in the positional relationship between the authenticity determination device 1 and the anti-counterfeit medium 400 in FIG. 10B to be described later. FIG. 10B is a side view of FIG. 10A. In FIG. 10B, the imaging direction of the imager 101 is not parallel with the normal of the surface of the anti-counterfeit medium 400, and the normal of the surface of the anti-counterfeit medium 400 has an angle to the imaging direction. However, the angle is not a predetermined angle for capturing the observed pattern of light. Therefore, the observation object shape frame 100 having a shape corresponding to a certain angle to the normal of the surface of the anti-counterfeit medium 400 does not coincide with the through image 500 of the anti-counterfeit medium 400.

Figure 11A:
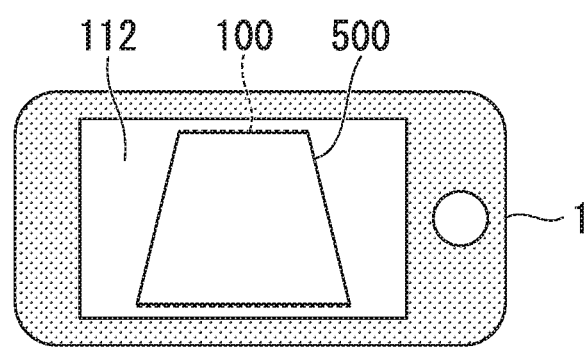
FIG. 11A is a top view showing the positioning of the observation object shape frame 100 depicted in FIG. 8 and the through image 500 of the anti-counterfeit medium 400.
Figure 11B:
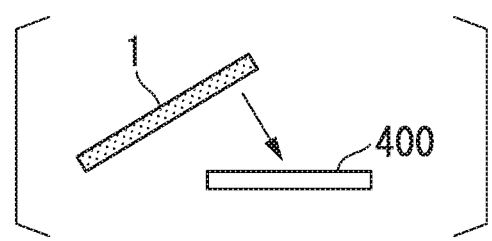
FIG. 11B is a side view showing the positioning of the observation object shape frame 100 depicted in FIG. 8 and the through image 500 of the anti-counterfeit medium 400.

FIG. 11A is a top view illustrating the observation object shape frame 100 and the through image 500 of the anti-counterfeit medium 400 in the positional relationship between the authenticity determination device 1 and the anti-counterfeit medium 400 in FIG. 11B to be described later. FIG. 11B is a side view of FIG. 11A. In FIG. 11B, the imaging direction of the imager 101 has the predetermined angle for observing the pattern of light to the normal of the surface of the anti-counterfeit medium 400. Therefore, the observation object shape frame 100 having a shape corresponding to the predetermined angle to the normal of the surface of the anti-counterfeit medium 400 coincides with the through image 500 of the anti-counterfeit medium 400.

Returning to FIG. 1, the shape similarity calculator 107 calculates a shape similarity between the observation object shape frame and the outer shape of the anti-counterfeit medium serving as the imaging object on the display screen. For example, the shape similarity calculator 107 obtains the mean squared error of the distance between the corresponding pixels of the observation object shape frame and the outer shape of the anti-counterfeit medium on the two-dimensional coordinates. The shape similarity calculator 107 then sets the mean squared error as the shape error, and sets the reciprocal of the shape error as the shape similarity.

The imaging determinator 108 performs imaging determination as to whether or not the observation angle and observation position of the image-capturing device are correct based on whether or not the shape similarity obtained by the shape similarity calculator 107 is equal to or greater than a preset shape similarity threshold. Then, when the shape similarity is equal to or greater than the preset shape similarity threshold, the imaging determinator 108 causes the imager 101 to capture the image data via the imaging controller 102.

FIGS. 12A and 12B are diagrams illustrating exemplary configurations of a captured image data table and a captured image data table for authenticity determination stored in the image data storage 113. FIG. 12A illustrates an exemplary configuration of the captured image data table in which the captured image data captured by the imager 101 is stored. It is indicated in FIG. 12A that captured image identification information for identifying the captured image data, the observation object shape frame identification information for identifying the observation object shape frame used for capturing the captured image data, and a captured image data address indicating an address in which the captured image data is written are written and stored in the image data storage 113 as a set.

FIG. 12B illustrates an exemplary configuration of the captured image data table for authenticity determination in which information on correct image data to be compared with the captured image data captured by the imager 101 is stored. It is indicated in FIG. 12B that the captured image identification information for identifying the captured image data, a correct image data address indicating an address in which the correct image data to be compared with the captured image data is stored, and the similarity between each piece of captured image data and the corresponding piece of correct image data are written and stored in the image data storage 113 as a set.

Returning to FIG. 1, the correct image generator 109 generates the correct image data to be compared with the captured image data corresponding to the observation object shape frame. The correct image data is image data observed from the same observation angle as the captured image data, and obtained from simulated image data corresponding to the structure of the anti-counterfeit medium 400 or captured image data obtained from the anti-counterfeit medium 400 captured in advance. As described above, the anti-counterfeit medium 400 is configured to be formed of a diffraction grating or holography, configured to be formed of an OVD ink or a pearl pigment including a pigment made from mica coated with a metal oxide, configured to be formed of repeatedly laminated layers having different refractive indices, or configured to be formed of cholesteric liquid crystal.

Therefore, the correct image generator 109 generates the correct image data in accordance with each of the above cases. For example, in the case where the anti-counterfeit medium 400 is formed using the diffraction grating, the correct image data is calculated and generated through simulation based on information on the design of the diffraction grating using a correct image generation function including the observation angle for the anti-counterfeit medium 400 corresponding to the observation object shape frame 100 as a parameter. The correct image generator 109 reads the observation object shape frame identification information from the captured image data table for authenticity determination in association with the captured image identification information of the captured image data to be compared. The correct image generator 109 also reads the observation angle and observation position corresponding to the observation object shape frame used for capturing the captured image data from the observation object shape frame table based on the imaging object shape identification information.

Then, the correct image generator 109 writes and stores the generated correct image data in the image data storage 113, and sets an initial address of the write region as the correct image data address. The correct image generator 109 writes and stores the correct image data address in the captured image data table for authenticity determination in the image data storage 113 in association with the captured image identification information of the captured image data to be compared.

The calculation with the correct image data function cannot be applied to the OVD ink or the pearl pigment, the repeatedly laminated layers having different refractive indices, or the cholesteric liquid crystal. In this case, the anti-counterfeit medium 400 is captured from a large number of observation angles, and the pieces of captured image data are recorded in a database in the image data storage 113 as the correct image data. Consequently, the correct image generator 109 may be configured to read the correct image data from the database in association with the observation angle for the captured image data to be compared, and write and store the correct image data address in the captured image data table for authenticity determination in association with the captured image identification information of the captured image data to be compared.

The similarity calculator 110 sequentially reads each of the captured image data identification information and the correct image data address corresponding to determination image data identification information with reference to the captured image data table for authenticity determination in the image data storage 113. Then, the similarity calculator 110 reads the captured image data address corresponding to the captured image data identification information from the captured image data table in the image data storage 113. As a result, the similarity calculator 110 reads the captured image data corresponding to the captured image data address and the correct image data corresponding to the correct image data address from the image data storage 113.

Then, the similarity calculator 110 calculates the similarity of the captured image data with respect to the read correct image data using template matching. For example, the similarity calculator 110 obtains the mean squared error of the luminance value of each of the corresponding pixels (in a color image, each of red, green, and blue (RGB) pixels) of the captured image data and the correct image data. The similarity calculator 110 then adds the mean squared error in all the pixels or a part of the corresponding pixels, and outputs the reciprocal of the addition result indicating the similarity. Therefore, the larger the similarity is, the more similar the captured image data is to the correct image data. As a part of the corresponding pixels, a portion with a characteristic pattern of light that significantly varies in accordance with the observation angle is selected and used with respect to the other pixels in the correct image data.

Alternatively, the similarity calculator 110 may be configured to convert RGB values of all the pixels or a part of the corresponding pixels of the captured image data and the correct image data into an appropriate color space, add the square value of the Euclidean distance in the color space, and output the reciprocal of the addition result indicating the similarity. As in the case of the mean squared error, the larger the similarity is, the more similar the captured image data is to the correct image data.

As described above, the similarity calculator 110 obtains the similarity between each piece of captured image data and the corresponding piece of correct image data sequentially in accordance with the determination image data identification information in the captured image data table for authenticity determination in the image data storage 113. Then, the similarity calculator 110 writes and stores the obtained similarity in the captured image data table for authenticity determination in the image data storage 113 in association with the captured image data identification information of the captured image data for which the similarity has been obtained.

In a case where the intensity of the illumination light at the time of capturing the captured image data does not correspond to that of the correct image data, the pixels cannot be simply compared with each other.

For this reason, the similarity calculator 110 may be configured to make an evaluation based on the RGB color tone between predetermined pixels. Specifically, the similarity calculator 110 may be configured to calculate the mean squared error of R/G (ratio of R gradation to G gradation) between the predetermined pixels of the captured image data and R/G between the pixels of the correct image data corresponding to the predetermined pixels of the captured image data, absorb the difference in the intensity of the illumination light, and calculate a value indicating the accurate similarity. As used herein, the term "predetermined pixels" refers to a combination of two pixels PA and PB. The ratio R/G is obtained by dividing the R gradation of the pixel PA by the G gradation of the pixel PB. Alternatively, B/G (ratio of B gradation to G gradation) may be used in combination with R/G. As the predetermined pixels, a combination of pixels indicating a large R/G or B/G ratio is set in advance.

The authenticity determinator 111 reads the similarities corresponding to all the pieces of determination image data identification information in the captured image data table for authenticity determination in the image data storage 113. Then, the authenticity determinator 111 compares each of the similarities corresponding to all the pieces of read determination image data identification information with a preset similarity threshold. The similarity threshold is obtained and set as an experimental value in advance. Specifically, the similarities between the pieces of captured image data captured at arbitrary angles (angles within the angle range to be described later) and the pieces of correct image data obtained in association with the observation angles for the pieces of captured image data are calculated for a plurality of different observation angles. Then, experimental similarities that exceed the similarities between the pieces of captured image data and the pieces of correct image data are set for the respective observation angles. Different similarity thresholds are obtained for the respective observation angles, and the authenticity determinator 111 performs the authenticity determination process for the anti-counterfeit medium using the similarity threshold corresponding to the observation angle.

In addition, the authenticity determinator 111 obtains the similarities of one or more pieces of captured image data, and if the similarity of at least one piece of captured image data is less than the similarity threshold, determines that the credit card 300 (authenticity determination object) provided with the anti-counterfeit medium 400 is counterfeit (fake). In contrast, the authenticity determinator 111 obtains the similarities of one or more pieces of captured image data, and if all the similarities are equal to or greater than the similarity thresholds, determines that the credit card 300 (authenticity determination object) provided with the anti-counterfeit medium 400 is authentic (genuine).

The display 112 is, for example, a liquid crystal display, and displays an image thereon.

In the image data storage 113, each of the above-mentioned captured image data, correct image data, captured image data table, captured image data table for authenticity determination, and observation object shape frame table is written and stored.

At the time of imaging, the imaging controller 102 determines whether or not the observation angle at which the anti-counterfeit medium is captured is within a preset angle range. As used herein, the angle range indicates the range of angles in which different colors or patterns of light can be observed on a diffraction grating or a hologram at different observation angles. When the observation angle is not included in the angle range, the correct image data with the captured color or pattern of light corresponding to the observation angle cannot be generated with a high degree of accuracy, and the authenticity of the anti-counterfeit medium cannot be accurately determined.

The imaging controller 102 causes the observation object shape image generator 105 to estimate the observation angle that is the imaging direction of the imager 101. Then, the imaging controller 102 displays, on the display screen of the display 112, an indication that the angle condition for the imaging process is satisfied when the observation angle estimated by the observation object shape image generator 105 is included in the angle range, or an indication that the angle condition for the imaging process is not satisfied when the estimated observation angle is not included in the angle range, thereby prompting the user to make an adjustment so as to obtain the observation angle within the angle range.

In addition, the imaging controller 102 determines whether or not the imager 101 that is about to capture the captured image data meets the imaging condition for capturing the captured image data having a quality comparable with the correct image data. As the imaging condition, whether or not the focal length in the imager 101 is equal to the focal length used in creating the coordinate transformation formula is detected. Then, the imaging controller 102 displays, on the display screen of the display 112, an indication that the imaging condition for the imaging process is satisfied when the current focal length is equal to the focal length used in creating the coordinate transformation formula, or an indication that the imaging condition for the imaging process is not satisfied when the current focal length is different from the focal length used in creating the coordinate transformation formula, thereby prompting the user to adjust the focal length. As necessary, the presence or absence of illumination or the illumination intensity may be added as the exposure condition under the imaging condition.

The imaging controller 102 also generates a luminance histogram when setting the exposure condition for the imager 101 as the imaging condition. The luminance histogram indicates the gradation distribution among the respective pixels. The imaging controller 102 uses the generated luminance histogram for determining whether or not the gradation distribution in the captured image data is biased toward the high-gradation or low-gradation side. For example, when the gradation distribution in the luminance histogram is biased toward the low-gradation side, that is, when the gradations are expressed in 256 levels ranging from "0" to "255", and a large number of pixels in the captured image data have gradations close to "0", blocked-up shadows are generated on the captured image data, and the captured image data cannot be compared with the correct image data. In contrast, when the gradation distribution in the luminance histogram is biased toward the high-gradation side, that is, when a large number of pixels in the captured image data have gradations close to "255", blown-out highlights are generated on the captured image data, and the captured image data cannot be compared with the correct image data.

Therefore, the exposure condition needs to be set so that the gradation distribution exists near the center of the range of "0" to "255" in the luminance histogram.

The imaging controller 102 determines whether or not the illumination needs to be adjusted on the basis of the gradation distribution in the luminance histogram. When it is estimated that blocked-up shadows are generated, and the illumination needs to be adjusted so that the distribution in the luminance histogram is shifted to the high-gradation side, the imaging controller 102 causes the exposure controller 103 to control the illuminator 104 so that the anti-counterfeit medium 400 is illuminated at a predetermined intensity when captured (for example, flash light is radiated in the imaging direction). In a case where the authenticity determination device 1 does not have the exposure controller 103 and the illuminator 104, the imaging controller 102 displays, on the display screen of the display 112, an indication to prompt the user to irradiate the anti-counterfeit medium 400 with light having a necessary light intensity.

In contrast, when it is estimated that blown-out highlights are generated, and the illumination needs to be adjusted so that the distribution in the luminance histogram is shifted to the low-gradation side, the imaging controller 102 causes the exposure controller 103 to control the illuminator 104 so that the anti-counterfeit medium 400 is not illuminated or is illuminated at a predetermined intensity when captured. The imaging controller 102 also displays, on the display screen of the display 112, an indication to prompt the user to reduce the current illumination intensity around the anti-counterfeit medium 400 in order to irradiate the anti-counterfeit medium 400 with light having a necessary light intensity.

In the process described above, an exposure control table containing the distribution state of the luminance histogram and control conditions such as the exposure condition and illumination intensity corresponding to the distribution state may be created and written in advance in the image data storage 113. In this case, the imaging controller 102 searches the exposure control table in the image data storage 113 for a luminance histogram similar to the pattern of the luminance histogram of the captured image data to be captured. The imaging controller 102 then reads information on the control conditions such as the exposure condition and illumination intensity for the captured image data to be captured, and displays the control conditions on the display screen of the display 112 as described above.

In addition, an illuminance sensor may be provided in the exposure controller 103, and the exposure condition and illumination illuminance may be set on the basis of the illuminance measured with the illuminance sensor. An exposure control table containing the illuminance and control conditions such as the exposure condition and illumination intensity corresponding to the illuminance may be created and written in advance in the image data storage 113. In this case, the imaging controller 102 searches the exposure control table in the image data storage 113 in association with the illuminance for capturing the captured image data. The imaging controller 102 then reads information on the control conditions such as the exposure condition and illumination intensity for the captured image data to be captured, and displays the control conditions on the display screen of the display 112 as described above.

Figure 13:
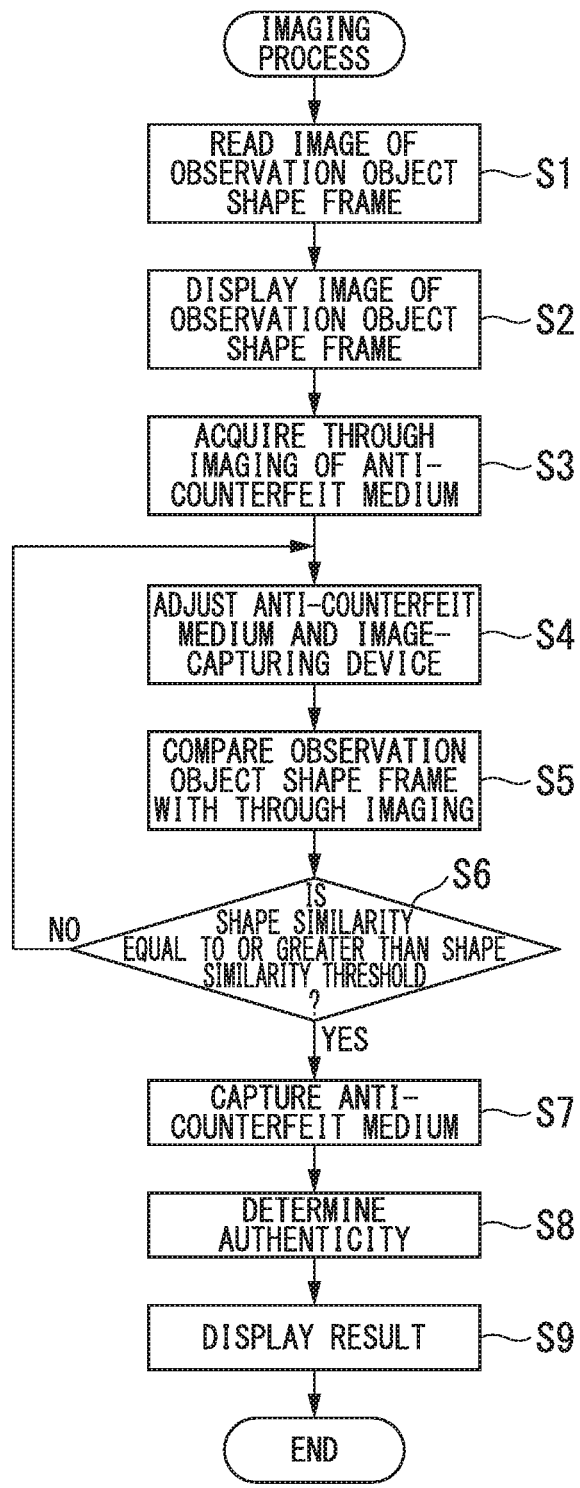
FIG. 13 is a flowchart illustrating an operation example of an authenticity determination process for an authenticity determination object provided with the anti-counterfeit medium in the identification device of the present embodiment.

Next, FIG. 13 is a flowchart illustrating an operation example of the authenticity determination process for the authenticity determination object provided with the anti-counterfeit medium in the identification device of the present embodiment. Hereinafter, the operation of the identification device subsequent to the execution of an authenticity determination application by the user will be described.

Step S1:

The imaging controller 102 instructs the observation object shape image display 106 to display, on the display screen of the display 112, the observation object shape frame 100 for capturing the anti-counterfeit medium 400.

Consequently, the observation object shape image display 106 reads the observation object shape frame 100 from the observation object shape frame table in the image data storage 113.

Step S2:

The observation object shape image display 106 displays, on the display screen of the display 112, the observation object shape frame 100 read from the observation object shape frame table in the image data storage 113.

In a case where the identification device can be used for the authenticity determination for a plurality of types of anti-counterfeit media 400, the observation object shape image display 106 may be configured to display, on the display screen of the display 112, a list of the plurality of types of anti-counterfeit media 400 (that is, types of cards) on which the authenticity determination can be performed, and prompt the user to select any one of them. In this case, the observation object shape image display 106 displays, on the display screen of the display 112, the observation object shape frame 100 corresponding to the anti-counterfeit medium 400 of the type selected by the user based on the observation object shape frame identification information associated with each type in the list. In this case, the observation object shape frames corresponding to the plurality of types are written and stored in advance in the image data storage 113 together with the pieces of observation object shape frame identification information for identifying the respective frames.

Step S3:

The imaging controller 102 displays, as the through image 500, the image of the anti-counterfeit medium 400 to be captured by the imager 101 on the display 112 on which the observation object shape frame 100 is displayed.

Step S4:

On the display 112, the user performs the positioning of the outer peripheral portion (image of lines indicating the outer periphery) of the image of the observation object shape frame 100 displayed by the observation object shape image display 106 and the outer peripheral portion of the displayed through image 500 of the anti-counterfeit medium 400 captured by the imager 101 as described with reference to FIGS. 4 to 6.

In a case where the outer periphery of the anti-counterfeit medium 400 has a quadrangular shape, and the observation object shape frame 100 is an image of the respective vertices (four vertices) of the quadrangle, the user adjusts the imaging direction and position of the imager 101 so that the respective vertices of the observation object shape frame 100 overlap the corresponding vertices of the through image 500 of the anti-counterfeit medium 400.

Step S5:

Next, the shape similarity calculator 107 obtains the mean squared error of the distance between the corresponding pixels (coordinate points) of the outer peripheral portion of the image of the observation object shape frame 100 and the outer peripheral portion of the through image 500 of the anti-counterfeit medium 400. The shape similarity calculator 107 then sets the mean squared error as the shape error, and outputs the reciprocal of the shape error as the shape similarity to the imaging determinator 108.

Step S6:

Then, the imaging determinator 108 determines whether or not the shape similarity is equal to or greater than the preset shape similarity threshold. If the shape similarity is equal to or greater than the shape similarity threshold, the imaging determinator 108 advances the process to step S7.

In contrast, if the shape similarity is less than the shape similarity threshold, the imaging determinator 108 advances the process to step S4.

Step S7:

In response to determining that the shape similarity is equal to or greater than the shape similarity threshold, the imaging determinator 108 outputs an instruction to capture the anti-counterfeit medium 400 to the imaging controller 102.

Consequently, the imaging controller 102 inputs the captured image data of the imaging object captured by the imager 101, and writes and stores the captured image data in the image data storage 113. The imaging controller 102 also writes and stores, in the captured image data table in the image data storage 113, the captured image data address indicating the address in which the captured image data has been written and the observation object shape frame identification information of the observation object shape frame corresponding to the captured image data together with the captured image data identification information provided to the captured image data.

Step S8:

The authenticity determinator 111 determines the authenticity of the captured image data based on the similarity between the captured image data and the correct image data (details will be described later).

Step S9:

The authenticity determinator 111 displays, on the display 112, the result of the authenticity determination for the anti-counterfeit medium captured in the captured image data.

Figure 14:
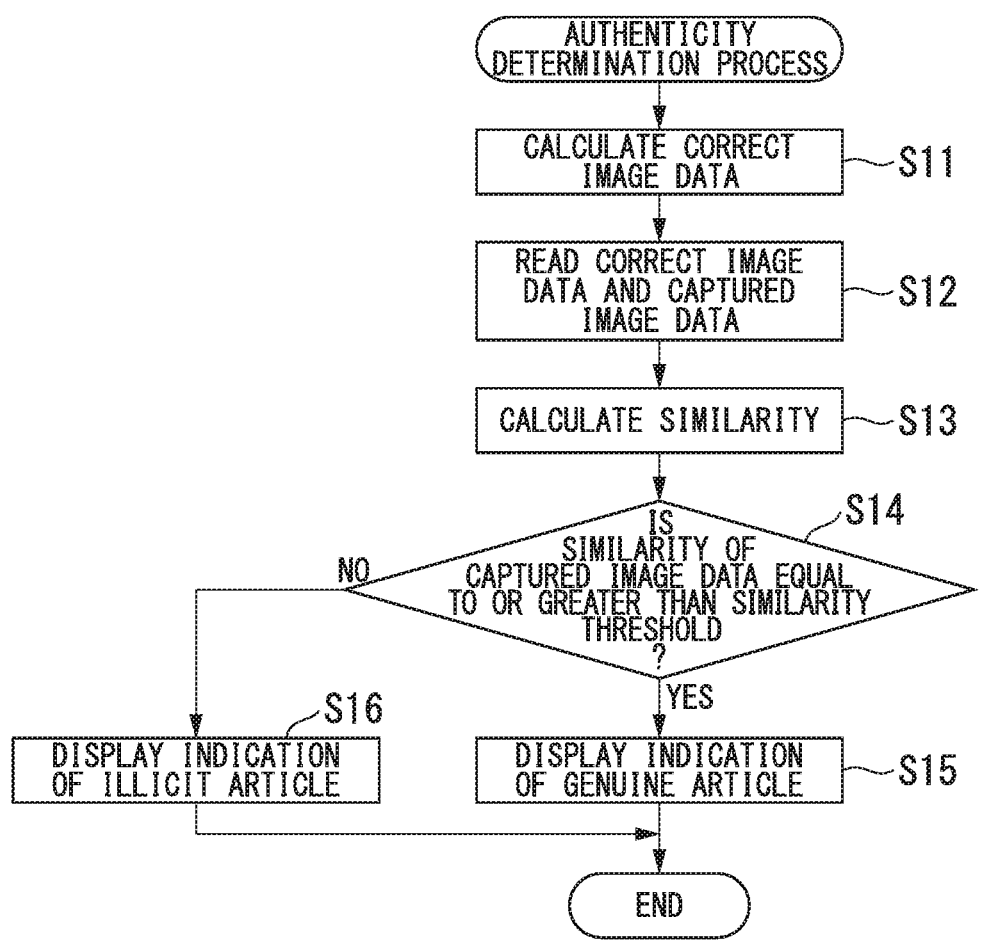
FIG. 14 is a flowchart illustrating an operation example of the authenticity determination process for the authenticity determination object provided with the anti-counterfeit medium in the identification device of the present embodiment.

Next, FIG. 14 is a flowchart illustrating an operation example of the authenticity determination process for the authenticity determination object provided with the anti-counterfeit medium in the identification device of the present embodiment. The flowchart of FIG. 14 explains in detail an operation example of the authenticity determination process in FIG. 8.

Step S11:

The correct image generator 109 refers to the captured image data table for authenticity determination to read, from the observation object shape frame table in the image data storage 113, the information on the observation angle and observation position for the observation object shape frame indicated by the captured image data identification information of the authenticity determination object.

Then, the correct image generator 109 generates the correct image data to be compared with the captured image data corresponding to the observation object shape frame based on the information on the observation angle and observation position corresponding to the observation object shape frame used for imaging. The correct image generator 109 then writes and stores the generated correct image data in the image data storage 113. In addition, the correct image generator 109 writes and stores, in the captured image data table for authenticity determination in the image data storage 113, the correct image data address indicating the address in which the correct image data has been written together with the captured image data identification information.

Step S12:

Next, the similarity calculator 110 reads, from the captured image data table in the image data storage 113, the captured image data address of the captured image data to be subjected to the authenticity determination.

The similarity calculator 110 also reads, from the captured image data table for authenticity determination in the image data storage 113, the correct image data address corresponding to the captured image identification information of the captured image data to be subjected to the authenticity determination.

Then, the similarity calculator 110 reads the captured image data address and the correct image data address from the image data storage 113 using the captured image data address and the correct image data address, respectively.

Step S13:

Next, the similarity calculator 110 calculates the similarity between each piece of captured image data and the corresponding piece of correct image data, for example, by adding the mean squared error of the luminance value of each of the pixels in all the pixels (or preset feature points) and setting the reciprocal of the mean squared error as the similarity.

The similarity calculator 110 then writes and stores the calculated similarity in the captured image data table for authenticity determination in the image data storage 113 in association with the captured image data identification information indicating the captured image data to be subjected to the determination.

Step S14:

The authenticity determinator 111 reads, from the image data storage 113, the similarity threshold corresponding to the captured image data to be subjected to the determination, and reads, from the captured image data table for authenticity determination in the image data storage 113, the similarity of the captured image data to be subjected to the determination.

Then, the authenticity determinator 111 determines whether or not the read similarity is equal to or greater than the similarity threshold.

If the similarity is equal to or greater than the similarity threshold, the authenticity determinator 111 advances the process to step S15. In contrast, if the similarity is less than the similarity threshold, the authenticity determinator 111 advances the process to step S16.

Step S15:

The authenticity determinator 111 generates a display image indicating that the anti-counterfeit medium subjected to the determination is authentic (genuine article).

Step S16:

The authenticity determinator 111 generates a display image indicating that the anti-counterfeit medium subjected to the determination is fake (counterfeit article/duplication, that is, illicit article).

Owing to the above configuration, according to the present embodiment, the imaging direction and position of the imager 101 are adjusted so that the through image 500 of the anti-counterfeit medium overlaps the observation object shape frame so as to coincide with the observation object shape frame, and the anti-counterfeit medium can be captured in such an overlapping state that the through image 500 is determined to coincide with the observation object shape frame to a predetermined extent. Therefore, the captured image data obtained from the captured anti-counterfeit medium can be compared with the correct image data which is the image of the authentic anti-counterfeit medium captured at the observation angle for the captured image data, whereby the determination as to whether the anti-counterfeit medium is authentic or fake can be easily performed. Thus, without using a conventional special authenticity determination device and without depending on the installation state of the anti-counterfeit medium, the authenticity of the anti-counterfeit medium can be determined using a simple image-capturing device such as a general-purpose digital camera, and the authenticity determination (identification as to whether authentic or fake) for the anti-counterfeit medium can be easily performed.

In addition, as illustrated in FIG. 2, information indicating the direction in which the anti-counterfeit medium 400 is to be captured may be attached to the surface of the credit card 300 provided with the anti-counterfeit medium 400, as indicated by an arrow of a mark 600. Consequently, in a case where the anti-counterfeit medium 400 has a quadrangular or circular shape, the side direction in which the pattern of light is to be captured can be easily recognized, and the imaging process for the anti-counterfeit medium can be performed more readily. Alternatively, the mark 600 may be attached to an upper surface of the anti-counterfeit medium 400 that the user can observe, not to the surface of the credit card 300. Still alternatively, the imaging controller 102 may be configured to have the function of detecting the image of the mark 600 in the captured image data. In a case where the imaging direction is significantly different from the mark 600, the imaging controller 102 may notify the user that the image-capturing direction is different from the mark 600 using an indication to prompt the user to change the imaging side.

In addition, a candidate image data extractor (not illustrated) may be provided. Specifically, the candidate image data extractor compares the captured image data with pieces of candidate image data having lower resolutions than the pieces of correct image data of a plurality of different types of anti-counterfeit media, and extracts a piece of candidate image data having the highest similarity.

Then, the similarity calculator 110 calculates the similarity by comparing the captured image data with the piece of correct image data of the anti-counterfeit medium of the type corresponding to the piece of candidate image data extracted by the candidate image data extractor. As described above, the authenticity determinator 111 performs the authenticity determination based on the similarity calculated by the similarity calculator 110. Owing to the above configuration, the user does not need to select which type of anti-counterfeit medium is to undergo the authenticity determination, and the authenticity determination process for the authenticity determination object can be performed more easily.

Second Embodiment

Hereinafter, a second embodiment of the present invention will be described with reference to the drawings.

The identification system (authenticity determination device, or identification device) according to the second embodiment is similar to the identification system of FIG. 1 according to the first embodiment. In the first embodiment, the authenticity determination process is performed even when only a single piece of captured image data can be used for the authenticity determination. In the second embodiment, the authenticity determination process is performed when a preset number of pieces of captured image data can be used for the authenticity determination. In this case, a set number of pieces of captured image data need to be captured at different observation angles and observation positions.

Figure 15:
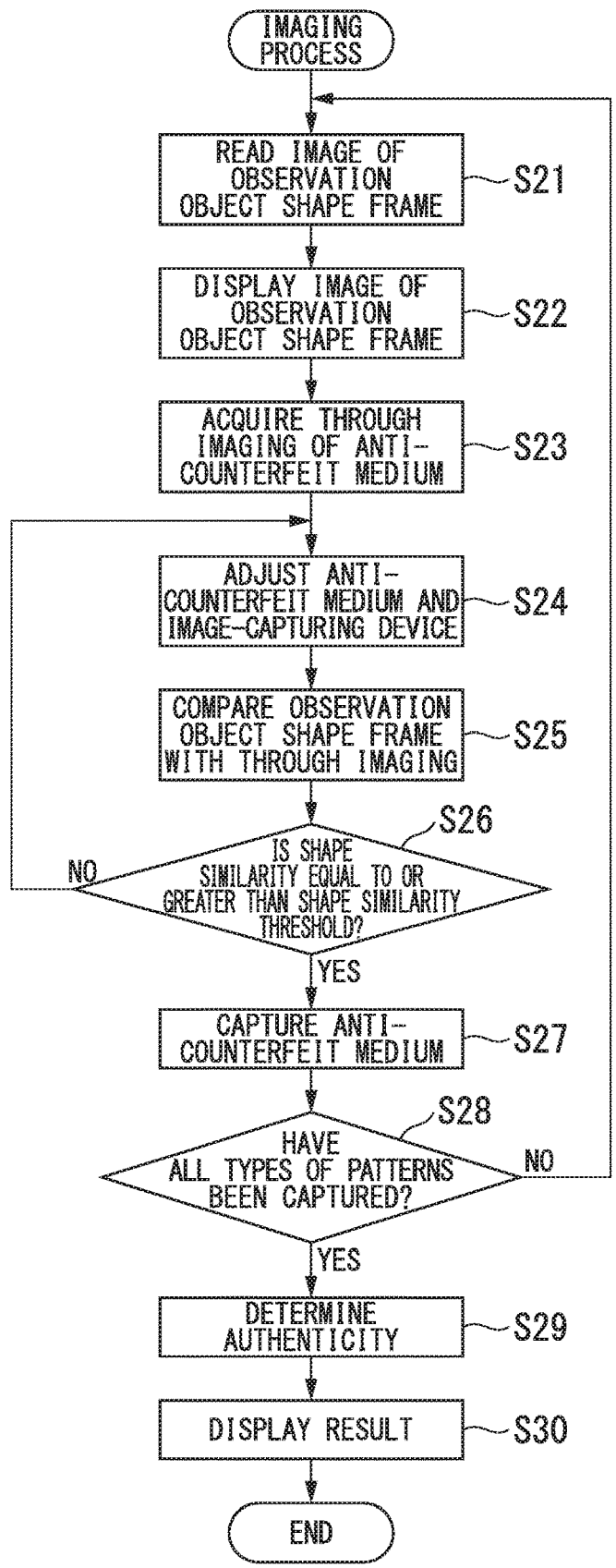
FIG. 15 is a flowchart illustrating an operation example of the authenticity determination process for the authenticity determination object provided with the anti-counterfeit medium in the identification device of a second embodiment.

FIG. 15 is a flowchart illustrating an operation example of the authenticity determination process for the authenticity determination object provided with the anti-counterfeit medium in the identification system of the second embodiment.

Steps S21 to S27, S29, and subsequent steps are similar to those of the flowchart of FIG. 13 according to the first embodiment. Hereinafter, only the operation different from that of the first embodiment will be described.

In a case where the identification system can be used for the authenticity determination for a plurality of types of anti-counterfeit media 400, the observation object shape image display 106 may be configured to display, on the display screen of the display 112 before the following processes in the flowchart is performed, a list of the plurality of types of anti-counterfeit media 400 (that is, types of cards) on which the authenticity determination can be performed, and prompt the user to select any one of them. In this case, the observation object shape image display 106 displays, on the display screen of the display 112, the observation object shape frame 100 corresponding to the anti-counterfeit medium 400 of the type selected by the user based on the observation object shape frame identification information associated with each type in the list. In this case, the observation object shape frames corresponding to the plurality of types are written and stored in advance in the image data storage 113 together with the pieces of observation object shape frame identification information for identifying the respective frames. In the case where the identification system can be used for the plurality of types of anti-counterfeit media 400, each of the captured image data table, the observation object shape frame table, and the captured image data table for authenticity determination is created in association with each type of card.

Step S21:

The imaging controller 102 instructs the observation object shape image display 106 to display, on the display screen of the display 112, the observation object shape frames 100 that are used for capturing the anti-counterfeit medium 400 in order of the observation object shape frame table.

Consequently, the observation object shape image display 106 reads the observation object shape frames 100 from the observation object shape frame table in the image data storage 113 in order from the top, for example.

Step S22:

The observation object shape image display 106 displays, on the display screen of the display 112, the observation object shape frame 100 read from the observation object shape frame table in the image data storage 113.

Step S23:

The imaging controller 102 displays, as the through image 500, the image of the anti-counterfeit medium 400 to be captured by the imager 101 on the display 112 on which the observation object shape frame 100 is displayed.

Since steps S24, S25, S26, and S27 are respectively similar to steps S4, S5, S6, and S7 in FIG. 13, these processes are not described herein.

Step S28:

Next, the observation object shape image display 106 determines whether or not all the types of patterns have been captured, that is, whether or not the observation object shape frames in the observation object shape frame table have been displayed. If the images of all the observation object shape frames in the observation object shape table have been displayed, the observation object shape image display 106 advances the process to step S29. In contrast, if the images of all the observation object shape frames in the observation object shape table have not been displayed, the observation object shape image display 106 advances the process to step S21.

Step S29:

The authenticity determinator 111 determines the authenticity of the captured image data based on the similarities between the respective pieces of captured image data captured on the basis of the plurality of observation object shape frames and the pieces of correct image data corresponding to the pieces of captured image data (details will be described later).

Step S30:

The authenticity determinator 111 displays, on the display 112, the result of the authenticity determination for the anti-counterfeit medium captured in the captured image data.

Figure 16:
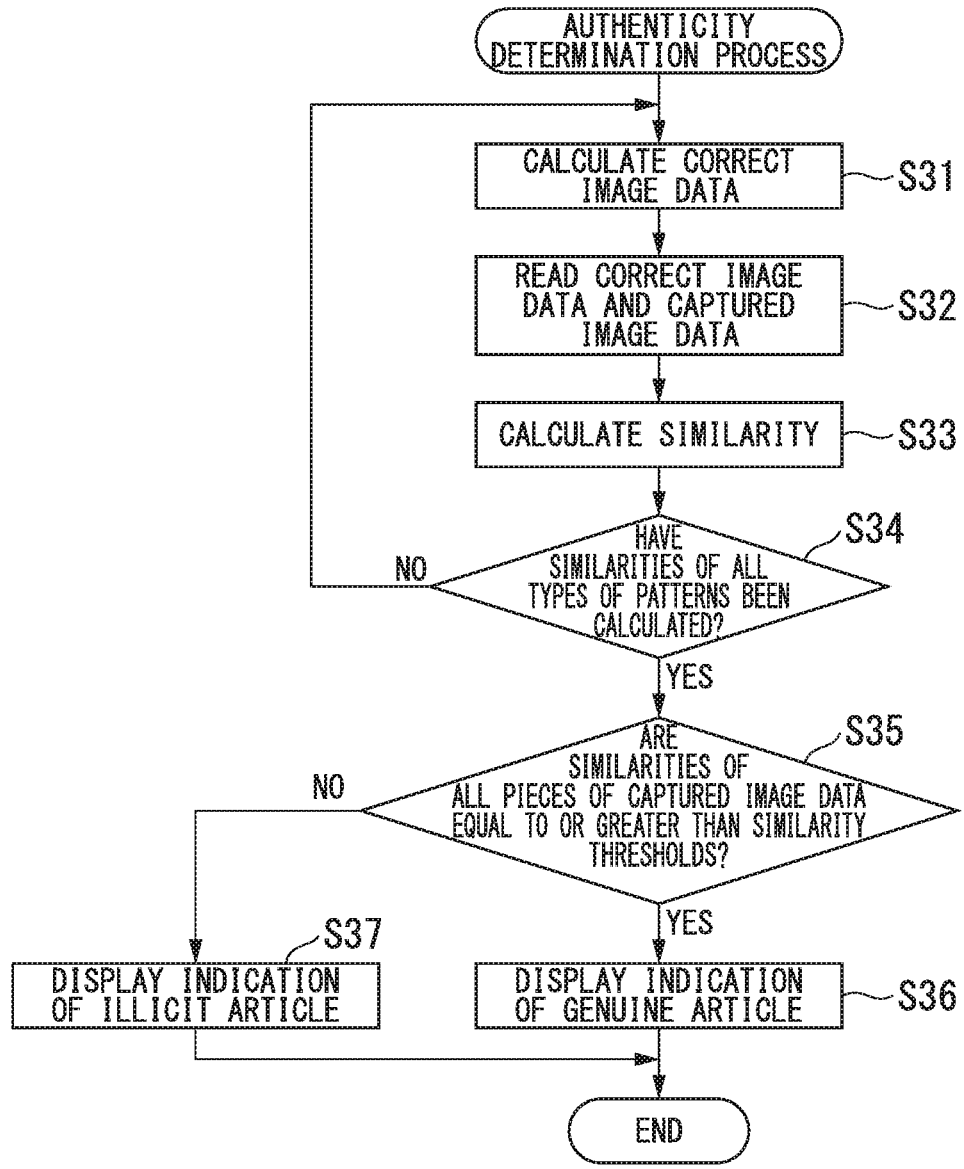
FIG. 16 is a flowchart illustrating an operation example of the authenticity determination process for the authenticity determination object provided with the anti-counterfeit medium in the identification device of the present embodiment.

Next, FIG. 16 is a flowchart illustrating an operation example of the authenticity determination process for the authenticity determination object provided with the anti-counterfeit medium in the identification system of the present embodiment. The flowchart of FIG. 16 explains in detail an operation example of the authenticity determination process in FIG. 15.

Step S31:

The correct image generator 109 refers to the captured image data table in the image data storage 113 to read the pieces of observation object shape frame identification information indicated by the pieces of captured image data identification information of the authenticity determination object in order from the top, for example. Then, using the read observation object shape frame identification information, the correct image generator 109 reads, from the observation object shape frame table in the image data storage 113, the information on the observation angle and observation position for the observation object shape frame indicated by the observation object shape frame identification information.

Then, the correct image generator 109 generates the correct image data to be compared with the captured image data corresponding to the observation object shape frame based on the read information on the observation angle and observation position. The correct image generator 109 then writes and stores the generated correct image data in the image data storage 113. In addition, the correct image generator 109 writes and stores, in the captured image data table for authenticity determination in the image data storage 113, the correct image data address indicating the address in which the correct image data has been written together with the captured image data identification information.

Step S32:

Next, the similarity calculator 110 reads, from the captured image data table in the image data storage 113, the captured image data addresses of the pieces of captured image data to be subjected to the authenticity determination in order from the top.

The similarity calculator 110 also reads, from the captured image data table for authenticity determination in the image data storage 113, the correct image data addresses corresponding to the pieces of captured image identification information of the pieces of captured image data to be subjected to the authenticity determination (pieces of captured image data whose captured image data addresses have been read).

Then, the similarity calculator 110 reads the captured image data addresses and the correct image data addresses from the image data storage 113 using the captured image data addresses and the correct image data addresses, respectively.

Step S33:

Next, the similarity calculator 110 calculates the similarity between each piece of captured image data and the corresponding piece of correct image data, for example, by adding the mean squared error of the luminance value of each of the pixels in all the pixels (or preset feature points) and setting the reciprocal of the mean squared error as the similarity.

The similarity calculator 110 then writes and stores the calculated similarity in the captured image data table for authenticity determination in the image data storage 113 in association with the captured image data identification information indicating the captured image data to be subjected to the determination.

Step S34:

The similarity calculator 110 determines whether or not the similarities of all the pieces of captured image data in the captured image data table have been calculated. In a case where the similarity calculator 110 reads the pieces of captured image data from the captured image data table in order from the top, the similarity calculator 110 determined whether or not the similarities of all the pieces of captured image data in the captured image data table have been calculated based on whether or not the piece of captured image data in the final row has been read.

If the similarities of all the pieces of captured image data in the captured image data table have been calculated, the similarity calculator 110 advances the process to step S35. In contrast, if the similarities of all the pieces of captured image data in the captured image data table have not been calculated, the similarity calculator 110 advances the process to step S31.

Step S35:

The authenticity determinator 111 reads, from the image data storage 113, the similarity thresholds corresponding to the pieces of captured image data to be subjected to the determination, and reads, from the captured image data table for authenticity determination in the image data storage 113, the similarities of all the pieces of captured image data to be subjected to the determination.

Then, the authenticity determinator 111 determines whether or not all the read similarities are equal to or greater than the similarity thresholds. If all the read similarities are equal to or greater than the similarity thresholds, the authenticity determinator 111 advances the process to step S36. In contrast, if one or more of the read similarities are less than the similarity thresholds, the authenticity determinator 111 advances the process to step S37.

Step S36:

The authenticity determinator 111 generates a display image indicating that the anti-counterfeit medium subjected to the determination is authentic (genuine article).

Step S37:

The authenticity determinator 111 generates a display image indicating that the anti-counterfeit medium subjected to the determination is fake (counterfeit article/duplication).

Owing to the above configuration, according to the present embodiment, the imaging direction and position of the imager 101 are adjusted so that the through image 500 of the anti-counterfeit medium overlaps the observation object shape frame so as to coincide with the observation object shape frame, and the anti-counterfeit medium can be captured in such an overlapping state that the through image 500 is determined to coincide with the observation object shape frame to a predetermined extent. Therefore, the captured image data obtained from the captured anti-counterfeit medium can be compared with the correct image data which is the image of the authentic anti-counterfeit medium captured at the observation angle for the captured image data, whereby the determination as to whether the anti-counterfeit medium is authentic or fake can be easily performed. Thus, without using a conventional special authenticity determination device and without depending on the installation state of the anti-counterfeit medium, the authenticity of the anti-counterfeit medium can be determined using a simple image-capturing device such as a general-purpose digital camera, and the authenticity determination (identification as to whether authentic or fake) for the anti-counterfeit medium can be easily performed.

In addition, in the present embodiment, in order to capture the anti-counterfeit medium at different observation angles and observation positions, the imaging direction and position of the imager 101 are adjusted so that the through image 500 of the anti-counterfeit medium overlaps the observation object shape frame corresponding to each observation angle and observation position so as to coincide with the observation object shape frame, and the anti-counterfeit medium can be captured, at each of the plurality of observation angles and observation positions, in such an overlapping state that the through image 500 is determined to coincide with the observation object shape frame to a predetermined extent. Since a number threshold which is the number of pieces of captured image data that can be used for the authenticity determination is set in accordance with the characteristics of the anti-counterfeit medium, the authenticity determination for each anti-counterfeit medium can be performed with a high degree of accuracy.

Third Embodiment

Hereinafter, a third embodiment of the present invention will be described with reference to the drawing.

Figure 17:
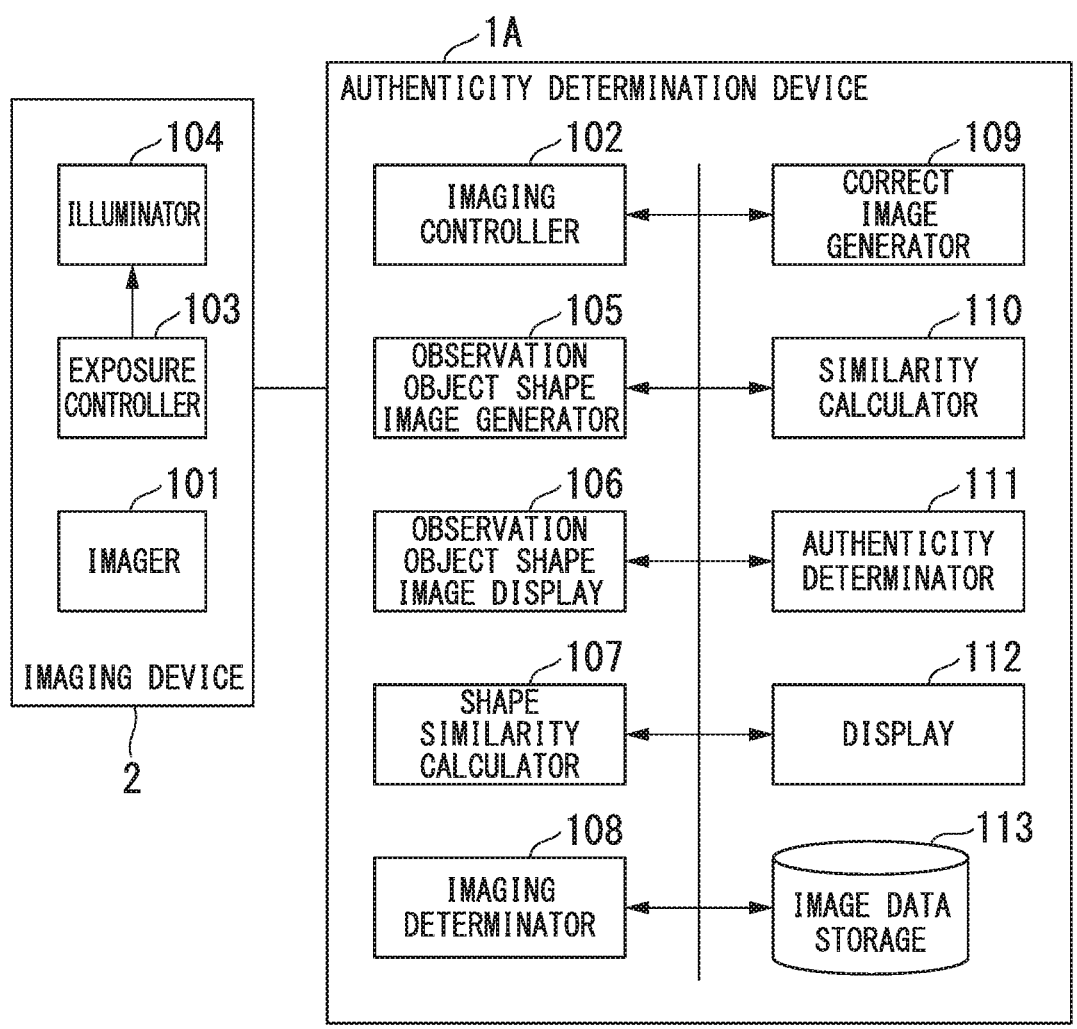
FIG. 17 is a block diagram illustrating an exemplary configuration of an identification device according to a third embodiment.

FIG. 17 is a block diagram illustrating an exemplary configuration of an identification system (authenticity determination device, or identification device) according to the third embodiment. In FIG. 17, the identification system includes an authenticity determination device 1A and an imaging device 2. The authenticity determination device 1A includes the imaging controller 102, the observation object shape image generator 105, the observation object shape image display 106, the shape similarity calculator 107, the imaging determinator 108, the correct image generator 109, the similarity calculator 110, the authenticity determinator 111, the display 112, and the image data storage 113. The imaging device 2 includes the imager 101, the exposure controller 103, and the illuminator 104. In FIG. 17, the components similar to those of the first embodiment are denoted by the same reference signs.

In the present embodiment, the identification system is configured so that the imaging and exposure functions in the first embodiment are separated from the authenticity determination device 1A and included in the imaging device 2. Consequently, a general-purpose digital camera, a mobile terminal (including a mobile phone and a smartphone) or the like can be easily used as the imaging device for capturing the captured image data for the authenticity determination.

The authenticity determination device 1A may have a cloud configuration so as to be communicable with a digital camera or a mobile terminal using an information communication line such as the Internet (not illustrated). Then, in the same way as the authenticity determination device 1 of the first or second embodiment described above, the authenticity determination device 1A may be configured to perform the authenticity determination process for the anti-counterfeit medium using the captured image data sent from the digital camera or the mobile terminal.

In the description of the first to third embodiments, the anti-counterfeit medium is provided on a plane such as a credit card. However, the above-mentioned authenticity determination process may be performed on an anti-counterfeit medium attached on a three-dimensional curved surface such as a bat and a soccer ball so as to have a shape conforming to the curved surface.

The authenticity determination process may be performed on the anti-counterfeit medium using the captured image data in such a manner that a program for realizing the function of the authenticity determination device 1 in FIG. 1 or the authenticity determination device 1A in FIG. 17 according to the present invention is recorded in a computer-readable recording medium, and the program recorded in the recording medium is read and executed by a computer system. As used herein, the "computer system" includes an OS and hardware such a peripheral device.

The "computer system" also includes a WWW system provided with a webpage provision environment (or display environment). The "computer-readable recording medium" refers to a storage device such as a portable medium and a hard disk incorporated in the computer system. Examples of the portable medium include a flexible disk, a magneto-optical disk, a ROM, a CD-ROM, and the like. In a case where the program is sent via a network such as the Internet or a communication line such as a telephone line, the "computer-readable recording medium" includes a server and a volatile memory (RAM) in the computer system that serves as a client, which hold the program for a certain period of time.

The program may be transmitted from the computer system equipped with a storage device or the like containing the program to another computer system via a transmission medium or by a transmission wave in the transmission medium. As used herein, the "transmission medium" for transmitting the program refers to a medium having the function of transmitting information, examples of which include a network (communication network) such as the Internet and a communication line (communication wire) such as a telephone line. The program may realize a part of the above-described functions. Furthermore, the program may be a difference file (difference program) which can realize the above-described functions in combination with a program already recorded in the computer system.

What is claimed is:

1. An identification device that performs authenticity determination on an article with an anti-counterfeit medium attached, the identification device comprising:
    at least one controller to:
        display, on a display screen, an observation object shape image indicating a shape of the anti-counterfeit medium to be observed at an observation angle, and display an image of the anti-counterfeit medium serving as an imaging object of an image-capturing device, the anti-counterfeit medium being designed such that an observed pattern of light from the anti-counterfeit medium varies as the observation angle varies;
        calculate a shape similarity based on a template matching between the observation object shape image and the image of the anti-counterfeit medium serving as the imaging object on the display screen; and
        perform imaging determination as to whether or not the image of the anti-counterfeit medium corresponds to the observation angle and an observation position of the image-capturing device based on whether or not the shape similarity is equal to or greater than a preset shape similarity threshold.

2. The identification device according to claim 1, wherein the at least one controller is to generate the observation object shape image indicating the shape of the anti-counterfeit medium to be observed at the observation angle and the observation position of the image-capturing device and to indicate the observation angle and the observation position.

3. The identification device according to claim 1, wherein the at least one controller is to:
    control an image-capturing device to capture image data corresponding to the image of the anti-counterfeit medium serving as the imaging object;
    compare the captured image data with correct image data indicating a correct pattern of the anti-counterfeit medium to be observed at the observation angle, to obtain a similarity between the captured image data and the correct image data; and
    perform the authenticity determination as to whether or not the anti-counterfeit medium is correct based on whether or not the similarity exceeds a preset similarity threshold.

4. The identification device according to claim 3, wherein the at least one controller is to
    control the image-capturing device to capture pieces of image data to correspond to a plurality of different observation object shape images respectively;
    compare the captured pieces of image data to correspond respectively to the plurality of different observation object shape images, with respective pieces of correct image data respectively corresponding to the plurality of different observation object shape images, and
    perform the authenticity determination based on whether or not similarity between each of the captured pieces of image data and the respectively corresponding piece of correct image data exceeds the preset similarity threshold.

5. The identification device according to claim 3, wherein the at least one controller is to:
    compare the captured image data with pieces of candidate image data having lower resolutions than resolutions of pieces of correct image data of a plurality of different types of anti-counterfeit media,
    extract a piece of candidate image data having highest similarity among the pieces of candidate image data, and
    calculate a similarity between the captured image data and the piece of candidate image data extracted.

6. The identification device according to claim 1, wherein the at least one controller is to perform a notification function of giving a notification of an imaging direction for the anti-counterfeit medium corresponding to the observation object shape image.

7. An identification method for performing authenticity determination on an article with an anti-counterfeit medium attached, the identification method comprising:
    displaying, on a display screen using at least one controller, an observation object shape image indicating a shape of the anti-counterfeit medium to be observed at an observation angle, and displaying an image of the anti-counterfeit medium serving as an imaging object of an image-capturing device, the anti-counterfeit medium being designed such that an observed pattern of light from the anti-counterfeit medium varies as the observation angle varies;
    calculating, using the at least one controller, a shape similarity based on a template matching between the observation object shape image and image of the anti-counterfeit medium serving as the imaging object on the display screen; and performing, using the at least one controller, imaging determination as to whether or not the displayed outer shape of the anti-counterfeit medium corresponds to the observation angle and an observation position of the image-capturing device are correct based on whether the shape similarity is equal to or greater than a preset shape similarity threshold.

8. A computer-readable non-transitory storage medium comprising an identification program that causes a computer to execute an authenticity determination method for an article with an anti-counterfeit medium attached, the authenticity determination method comprising:

displaying, on a display screen, an observation object shape image indicating a shape of the anti-counterfeit medium to be observed at an observation angle, and displaying an image of the anti-counterfeit medium serving as an imaging object of an image-capturing device, the anti-counterfeit medium being designed such that an observed pattern of light from the anti-counterfeit medium varies as the observation angle varies;

calculating a shape similarity based on a template matching between the observation object shape image and the image of the anti-counterfeit medium serving as the imaging object on the display screen; and performing imaging determination as to whether or not the anti-counterfeit medium corresponds to the observation angle and an observation position of the image-capturing device based on whether or not the shape similarity is less than a preset shape similarity threshold.

* * * * *

UNITED STATES PATENT AND TRADEMARK OFFICE
CERTIFICATE OF CORRECTION

PATENT NO. : 10,538,122 B2  
APPLICATION NO. : 15/688100  
DATED : January 21, 2020  
INVENTOR(S) : Takashi Okada et al.

Page 1 of 1

It is certified that error appears in the above-identified patent and that said Letters Patent is hereby corrected as shown below:

In the Claims

Column 30, Line 65:  
In Claim 7, after "and" insert -- the --.

Column 31, Line 5:  
In Claim 7, after "device" delete "are correct".

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*